US011528266B2

(12) United States Patent
Sato

(10) Patent No.: US 11,528,266 B2
(45) Date of Patent: Dec. 13, 2022

(54) INFORMATION PROCESSING APPARATUS, SYSTEM, AND CONTROL METHOD THEREFOR

(71) Applicant: CANON KABUSHIKI KAISHA, Tokyo (JP)

(72) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 16/706,059

(22) Filed: Dec. 6, 2019

(65) Prior Publication Data

US 2020/0195637 A1 Jun. 18, 2020

(30) Foreign Application Priority Data

Dec. 12, 2018 (JP) ............................ JP2018-232344

(51) Int. Cl.

*H04L 9/40* (2022.01)
*H04L 9/32* (2006.01)
*G06F 9/54* (2006.01)
*H04N 1/44* (2006.01)

(52) U.S. Cl.

CPC ........ *H04L 63/0853* (2013.01); *H04L 9/3247* (2013.01); *H04L 63/083* (2013.01); *H04L 63/0861* (2013.01); *G06F 9/547* (2013.01); *H04N 1/442* (2013.01)

(58) Field of Classification Search

CPC . H04L 63/0853; H04L 9/3247; H04L 63/083; H04L 63/0861; G06F 9/547; H04N 1/442
See application file for complete search history.

(56) References Cited

U.S. PATENT DOCUMENTS 8,925,053 B1 * 12/2014 Mehta .................... G06F 21/31 726/4
2010/0128298 A1 * 5/2010 Matsugashita ........ G06F 3/1288 358/1.14
2011/0261388 A1 * 10/2011 Tsujimoto .............. H04L 63/08 358/1.14
2013/0003117 A1 * 1/2013 Hirata .................. G06F 3/1259 358/1.15
2016/0197962 A1 * 7/2016 Winn ................. H04L 63/0823 713/168

(Continued)

FOREIGN PATENT DOCUMENTS

JP 2018-28786 A 2/2018

*Primary Examiner* — Ghodrat Jamshidi

(74) *Attorney, Agent, or Firm* — Canon U.S.A., Inc. IP Division

(57) ABSTRACT

An apparatus and method for performing authentication using biometric authentication processing at a portable terminal connected to a multifunction peripheral (MFP) is provided. A web application accesses the portable terminal via a web browser of the MFP and the MFP transmits a request for information about service to the portable terminal. In a case where information corresponding to the web application is included in the information about service received from the portable terminal responsive to the request, the MFP transmits an authentication request to the portable terminal according to a request from the web application, and transmits, to the web application, an authentication result received from the portable terminal responsive to the authentication request.

8 Claims, 18 Drawing Sheets

(56) References Cited

U.S. PATENT DOCUMENTS

| | | | | |
|---|---|---|---|---|
| 2016/0308845 | A1* | 10/2016 | Quinlan | H04L 9/3247 |
| 2017/0346830 | A1* | 11/2017 | Goldfarb | H04L 63/102 |
| 2017/0366547 | A1* | 12/2017 | Goldfarb | H04L 63/083 |
| 2018/0241576 | A1* | 8/2018 | Liu | H04L 9/0822 |
| 2019/0005219 | A1* | 1/2019 | Matsuda | H04L 9/0894 |
| 2019/0075102 | A1* | 3/2019 | Kim | H04L 9/3239 |
| 2019/0220581 | A1* | 7/2019 | Li | G10L 19/018 |
| 2020/0143381 | A1* | 5/2020 | Chhibber | G06Q 20/3674 |

* cited by examiner

INFORMATION PROCESSING APPARATUS, SYSTEM, AND CONTROL METHOD THEREFOR

BACKGROUND

Field

Aspects of the present disclosure generally relate to a technique for an apparatus in which a web browser is implemented.

Description of the Related Art

Recently, there has been proposed a technique called WebBluetooth API or WebUSB API, which enables operating, via a JavaScript® program provided by a web application, a Bluetooth® device or a Universal Serial Bus (USB) device connected to a computer.

In this technique, it can be said that the web application operates a Bluetooth device or a USB device owned by the user via a web browser. Therefore. WebBluetooth API or WebUSB API is configured such that, before the web application operates a Bluetooth device or a USB device, the web browser displays a screen for permission prompt, thus asking the user to permit such an operation.

Furthermore, if the operation is permitted by the user via the displayed screen, the web browser stores information indicating the web application the operation of which is permitted and information indicating the device which is to be operated. From the next round onward. When operating the device the information about which has been stored, the web application the information about which has been stored in the web browser starts operation processing without asking for permission. With this, convenience is improved.

On the other hand, as a new authentication system including biometric authentication, Fast Identity Online (FIDO) is now attracting attention. With regard to biological information, such as a fingerprint or vein, for use in biometric authentication, if the information is leaked to outsiders, since the information is not able to be rewritten, unlike passwords for use in 1D or password authentication, information leakage becomes fatal. On the other hand, with regard to FIDO, a registration work is previously performed between a device located near the user and a server, so that a private key associated with biological information is registered with the device and a public key is registered with the server. Then, authentication is not performed on the server via the Internet but performed on the device located near e user, and an authentication result signed with the private key flows over the network. Thus, in FIDO, since no biological information flows over the network, it can be said that there is little risk of information leakage. A system using such FIDO is discussed in Japanese Patent Application Laid-Open No. 2018-28786.

In the system discussed in Japanese Patent Application Laid-Open No. 2018-28786, security is improved by not retaining biological information and a private key in a device which is temporarily used but retaining biological information and a private key in a portable terminal owned by the user. In other words, security is improved by using not a device which is temporarily used but the portable terminal as an authenticator for FIDO.

However, the system discussed in Japanese Patent Application Laid-Open No. 2018-28786 does not deal with the possibility of, for example, WebBluetooth API or WebUSB API being used when a device which is located at a public place or a device which is temporarily used and a portable terminal which serves as an authenticator are connected to each other via Bluetooth or USB.

SUMMARY

According to an aspect of the present disclosure, an information processing apparatus includes at least one memory storing instructions related to a web browser, and at least one processor executing the instructions causing the information processing apparatus to, in a case where a user uses a web application via the information processing apparatus and authentication processing is to be performed at an external terminal connected to the information processing apparatus, transmit a request for information about service to the external terminal, in a case where information about the web application is included in the information about service received from the external terminal responsive to the request, transmit an authentication request to the external terminal based on information required for authentication that is received from the web application, and transmit, to the web application, data about an authentication result received from the external terminal responsive to the authentication request.

Further features of the present disclosure will become apparent from the following description of exemplary embodiments with reference to the attached drawings.

DESCRIPTION OF THE EMBODIMENTS

Figure 1:
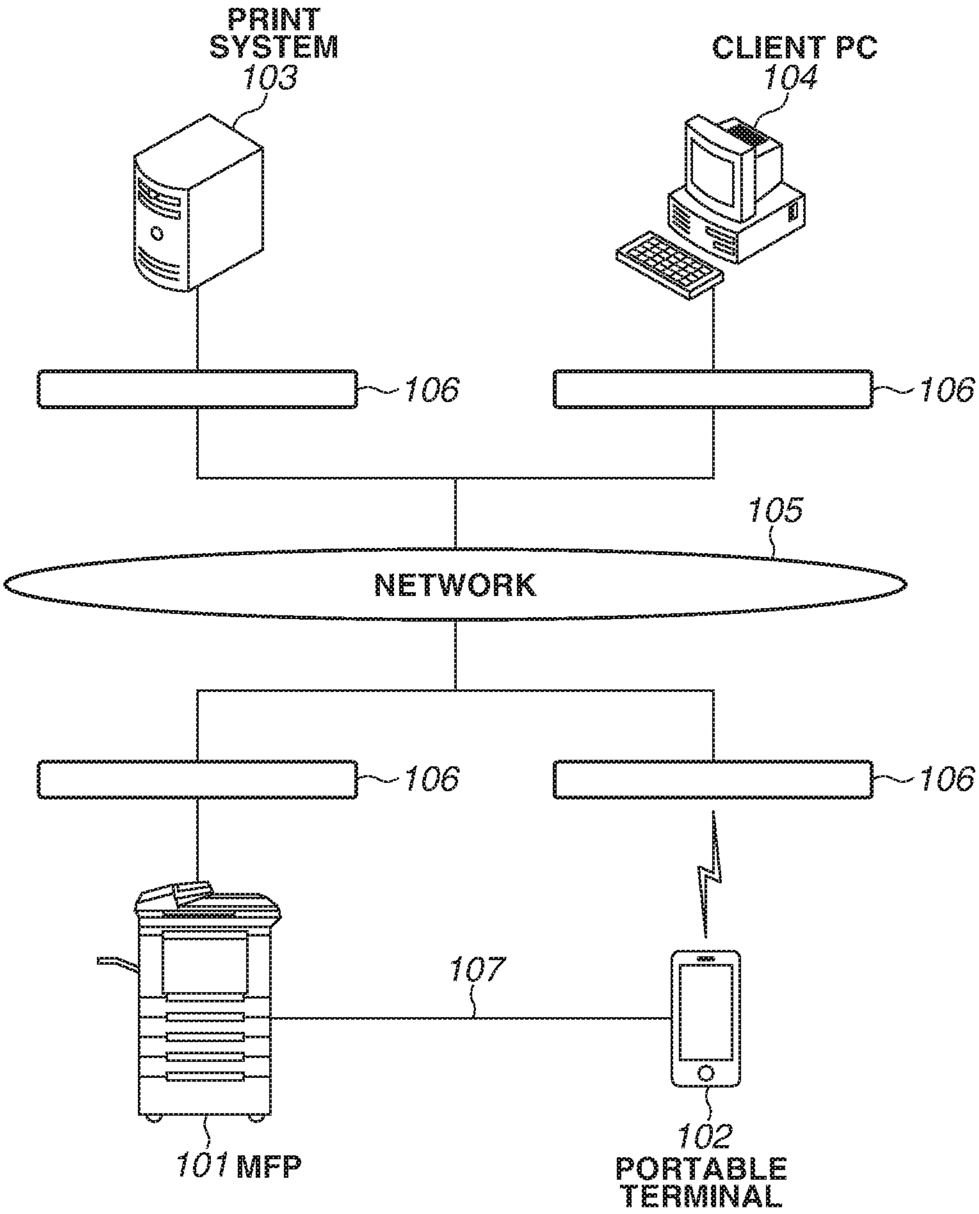
FIG. 1 is a diagram illustrating an example of the overall configuration of a system in an exemplary embodiment of the present disclosure.

In the following exemplary embodiments, an example in which an information processing apparatus such as a device which is located at a public place or a device which is temporarily used receives provision of a given service on a network while employing secure user authentication such as Fast Identity Online (FIDO) is described.

For example, in a case where provision of a given service on a network is received by a multifunction peripheral which is located at a public place such as a convenience store, using a result of biometric authentication obtained at a portable terminal of the user is supposed. In this case, it becomes possible to receive a personally-identified service at the multifunction peripheral, which is located at a public place, without the need to register or input authentication information (a password or biological information such as a fingerprint) to, for example, the multifunction peripheral or without the need to transmit the authentication information to the network.

Furthermore, in a case where a device which is located at a public place or a device which is temporarily used and a portable terminal which serves as an authenticator have been connected to each other via Bluetooth or USB, using, for example, WebBluetooth API or WebUSB API is supposed. This enables a web application for service on the network to cooperate with the portable terminal of the user via a web browser included in the device.

In WebBluetooth API or WebUSB API, when the web application accesses a Bluetooth or USB device via the web browser, the web browser provides a screen for permission prompt which is used to check whether to permit such an access. In other words, in the above-mentioned system, before authentication is performed at the portable terminal, in response to a request for access from the web application to the portable terminal of the user made on a screen of the device which is located at a public place, the web browser displays a screen for permission prompt to ask the user for permission. Here, since the user is asked for permission of an access to the portable terminal of the user on a screen of the device which is temporarily used, such as a screen the user is not regularly using, it is conceivable that the user may hesitate for such permission.

Additionally, according to WebBluetooth API or WebUSB API, in a case where permission by the user has been obtained via the permission prompt as mentioned above, the web browser causes a combination of identification information about the portable terminal and information about the web application to be stored as permission information in a device in which the web browser operates. On this occasion, the user may only recognize that the user has given only the permission of a temporary access. In such a case, information about the portable terminal of the user would be stored in, for example, a device which is located at a public place, without the intention of the user. From a viewpoint of the aim to assure security by not storing biometric authentication or a private key for authentication in such a device, it is desirable that information about the portable terminal of the user also be not stored in such a device.

In the following description, exemplary embodiments which are capable of solving the above-mentioned issues are described.

<System Configuration>

FIG. 1 is a diagram illustrating an example of the overall configuration of a system in a first exemplary of the present disclosure.

The system in the present exemplary embodiment includes a multifunction peripheral (MFP) 101, which is an example of an image processing apparatus, a portable terminal 102, a print system 103, and a client personal computer (PC) 104.

A network 105 is, for example, the Internet or an intranet. Networks 106 are terminal networks each used for connection of a device such as an MFP. The networks 106 are not limited to networks for wired communication, but can be wireless communication networks such as wireless local area networks (LANs) or mobile telephone communication networks.

Wired or wireless connection 107 connects the MFP 101 and the portable terminal 102 to each other. While, in the present exemplary embodiment, an example in which the connection 107 is Bluetooth connection is described, for example, Universal Serial Bus (USB), which is wired connection, can also be applied. In the present exemplary embodiment, an example in which the MFP 101 is located at a public place such as a convenience store or a library and the MFP 101 is connected to the print system 103 to enable pull printing is described. On that occasion, authentication is performed at an external terminal (portable terminal 102) which is connected to the MFP 101.

<Internal Configuration of Information Processing Apparatus>

Figure 2A:
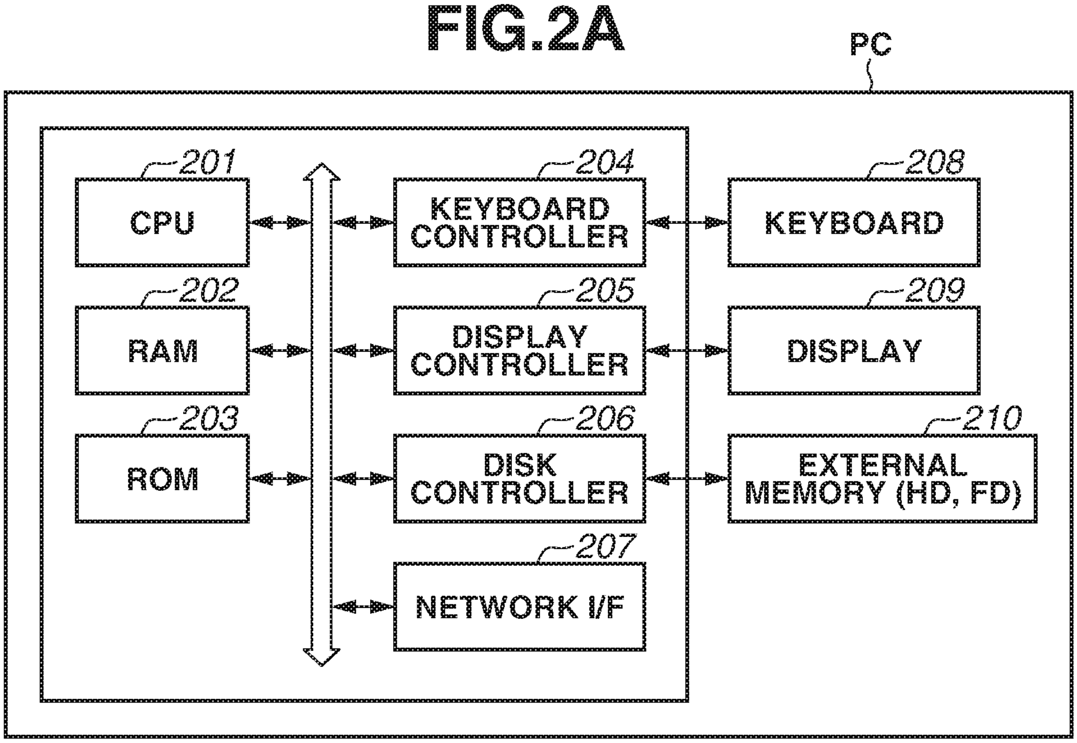
FIGS. 2A, 2B, and 2C are hardware configuration diagrams of the respective apparatuses included in the system in the exemplary embodiment.

FIG. 2A is a diagram illustrating an example of a configuration of an information processing apparatus which configures a server PC that provides the print system 103 or configures the client PC 104. Such an information processing apparatus can be configured with hardware of a general information processing apparatus.

A central processing unit (CPU) 201 executes programs stored in a read-only memory (ROM) 203 and programs such as an operating system (OS) and applications loaded from an external memory 210 onto a random access memory (RAM) 202. In other words, the CPU 201 executing the programs stored in the readable storage media functions as the respective processing units which perform processing operations illustrated in the flowcharts described below.

The RAM 202 is a main memory for the CPU 201 and functions as, for example, a work area. The ROM 203 is a non-volatile memory which stores various programs and data.

A keyboard controller 204 controls operation inputs output from a keyboard 208 or a pointing device (not illustrated) such as a mouse, a touch-pad, a touch panel, or a trackball.

A display controller 205 controls displaying which is performed by a display 209. A disk controller 206 controls data access to an external memory 210, such as a hard disk (HD), a solid-state drive (SSD), or a flexible disk (FD), which stores various pieces of data. A network interface (I/F) 207, which is connected to a network, performs communication control processing to be performed with other devices connected to the network.

Furthermore, the print system 103 can be a system implemented with a single computer or can be a system implemented with a plurality of computers. For example, the print system 103 can be a configuration implemented with use of, for example, a cloud service.

<Internal Configuration of Image Processing Apparatus (Multifunction Peripheral)>

Figure 2B:
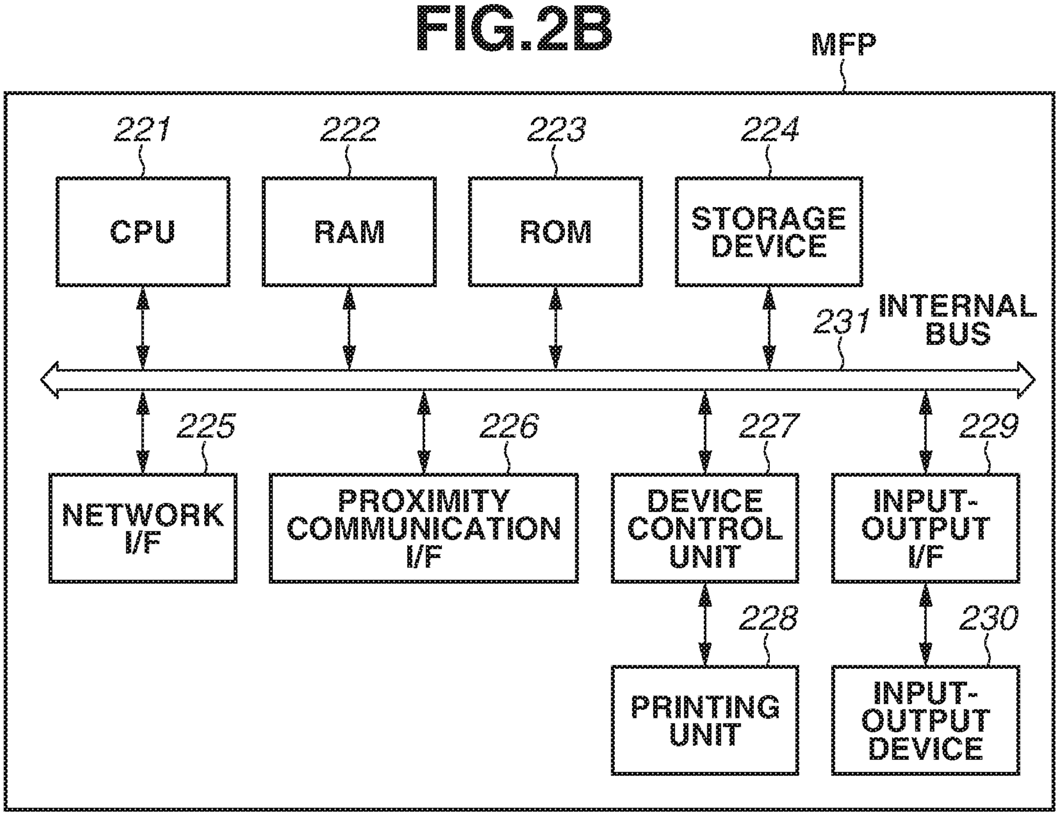

FIG. 2B is a diagram illustrating an example of a configuration of the MFP 101.

A CPU 221, which is provided with programs (also including programs for implementing respective processing operations described below) stored in a ROM 223, comprehensively controls respective devices via an internal bus 231. A RAM 222 functions as a memory and a work area for the CPU 221. The ROM 223 is a non-volatile memory which stores various programs and data.

A network LT 225 exchanges data with external network devices in one-way communication or bidirectional communication.

A proximity communication I/F 226, which is a network I/F for proximity communication such as Bluetooth, communicates with, for example, the portable terminal 102 to exchange data therewith.

A device control unit 227 controls a printing unit 228. A storage device 224, which is configured with, for example, a hard disk (HD) or a solid-state drive (SSD), functions as an external storage device. The CPU 221 performs execution processing for programs in conjunction with the RAM 222 and the ROM 223 and performs processing for recording image data on a recording medium such as the storage device 224.

An input-output device 230 represents a plurality of configurations playing a role of inputting and outputting in the MFP 101. Specifically, the input-output device 230 receives an input (for example, a button input) from the user and transfers a signal corresponding to the input to the above-mentioned processing units via an input-output I/F 229. Besides, the input-output device 230 also includes a display device (for example, a touch panel) which provides necessary information to the user and receives a user operation. Additionally, the input-output device 230 can also include a scan device which reads an original and receives electronic data as an input.

<Internal Configuration of Portable Terminal>

Figure 2C:
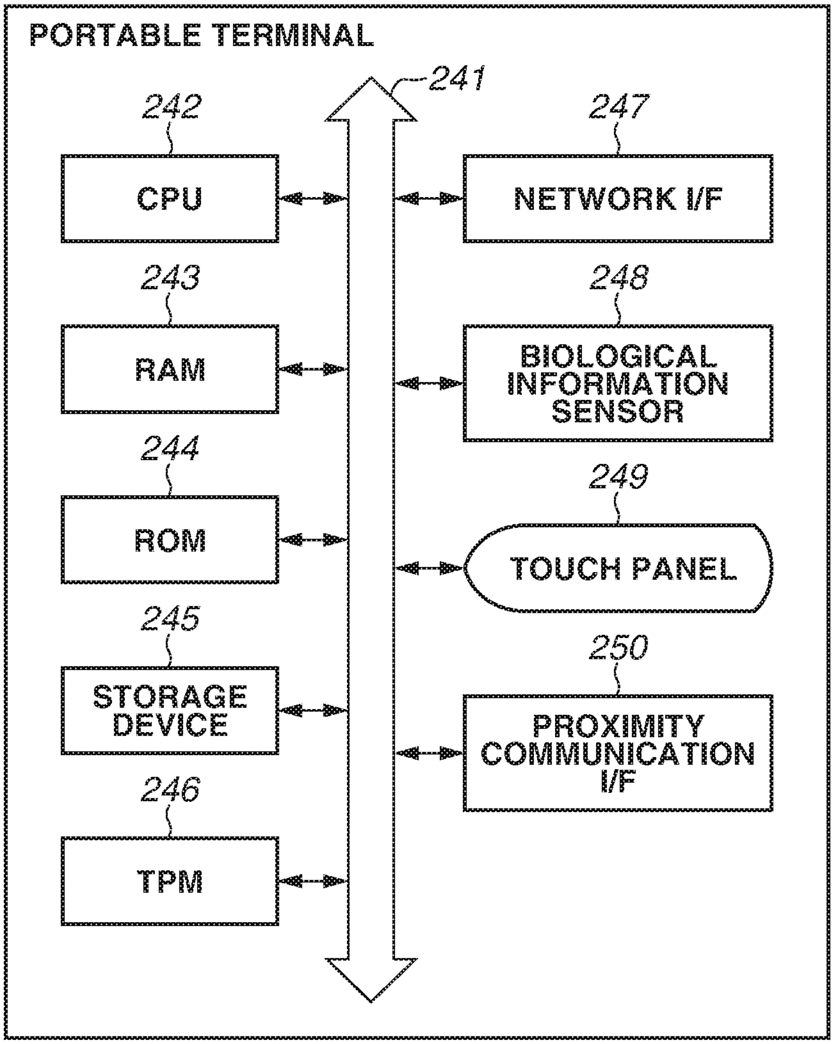

FIG. 2C is a diagram illustrating an internal configuration of the portable terminal 102.

A CPU 242, which is provided with programs (including programs for implementing processing operations described below) stored in a ROM 244, comprehensively controls various devices via an internal bus 241. A RAM 243 functions as a memory or work area for the CPU 242. The ROM 244 is a non-volatile memory which stores various programs and data.

A network I/F 247 exchanges data with external network devices via, for example, Wi-Fi in one-way direction or two-way direction. The CPU 242 performs execution processing for programs in conjunction with the RAM 243 and the ROM 244 and performs processing for recording data on a recording medium such as a storage device 245. The storage device 245 functions as an external storage device and is configured with, for example, a Secure Digital (SD) card.

Trusted Platform Module (TPM) 246 is a storage device having tamper resistance, which, for the purpose of processing or storing confidential information, prevents stored data from being read or viewed by outsiders. In the present exemplary embodiment, for example, biological information itself for use in biometric authentication or a feature amount of the biological information and a private key corresponding to the biological information are stored in the TPM 246. Data required for biometric authentication processing and stored in the TPM 246, such as biological information itself or a feature amount of the biological information, is referred to as "biological information".

A biological information sensor 248, which is a sensor that reads biological information about the user, reads information about, for example, a fingerprint, an iris, or a vein of the user and converts the read information into a signal.

A touch panel 249, which is provided with two functions, i.e., displaying and inputting functions, displays, for example, a screen or keyboard for an application and outputs, as an information signal to the outside, information about the position of a screen portion touched by the user pressing the screen with a finger or a dedicated pen. The output information signal being used by the application enables the user to operate the application via the touch panel 249.

A proximity communication FT 250 is an FT compatible with the communication method for proximity communication, such as Bluetooth, as with that in the MFP 101, and, in the present exemplary embodiment, the portable terminal 102 performs communication with the MFP 101 via the proximity communication I/F 250.

<Functional Configuration of MFP>

Figure 3A:
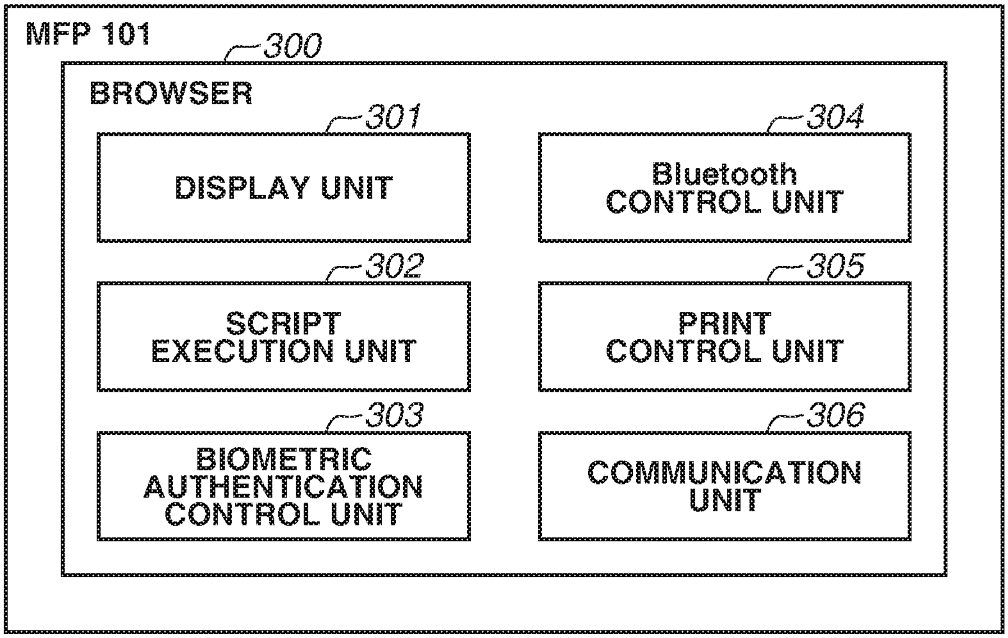
FIGS. 3A, 3B, 3C, and 3D are functional configuration diagrams of the respective apparatuses included in the system in the exemplary embodiment.

FIG. 3A is a block diagram illustrating an example of a functional configuration of the MFP 101.

In the MFP 101, which is an image processing apparatus that is applicable as an information processing apparatus according to the present exemplary embodiment, a browser 300 (also referred to as a "World Wide Web browser" or "web browser") operates. The browser 300 is implemented by the CPU 221 reading out a program stored in, for example, the ROM 223 included in the MFP 101 onto the RAM 222 and executing the read-out program.

The browser 300 includes a display unit 301, a script execution unit 302, a biometric authentication control unit 303, a Bluetooth control unit 304, a print control unit 305, and a communication unit 306.

The display unit 301 is a software module which displays Hypertext Markup Language (HTML) which, for example, a print service 370 of the print system 103 illustrated in FIG. 3C described below provides. Furthermore, the print service 370 is described below with reference to FIG. 3C. In the present exemplary embodiment, the display unit 301 displays a user interface (UI) for a list of pieces of print data or a UI for receiving an execution instruction for printing.

The script execution unit 302 is a software module which analyzes JavaScript which, for example, the print service 370 of the print system 103 provides and executes the JavaScript. In the present exemplary embodiment, the script execution unit 302 analyzes JavaScript which the print system 103 provides, and invokes the biometric authentication control unit 303, the Bluetooth control unit 304, and the print control unit 305.

The biometric authentication control unit 303 is a software module which requests an authenticator of the portable terminal 102 to perform biometric authentication and receives a result of the biometric authentication. In the present exemplary embodiment, an example in which the biometric authentication control unit 303 requests an authenticator 350 of the portable terminal 102 illustrated in FIG. 3B described below to perform biometric authentication is described.

The Bluetooth control unit 304 is software for connecting to a device equipped with Bluetooth and controlling the device. The Bluetooth control unit 304 provides an interface which is able to be called up from JavaScript, and is invoked by the script execution unit 302.

The print control unit 305 is a software module which performs printing of print data.

The communication unit 306 is a software module for communicating with an external system, such as the print system 103.

<Functional Configuration of Portable Terminal>

Figure 3B:
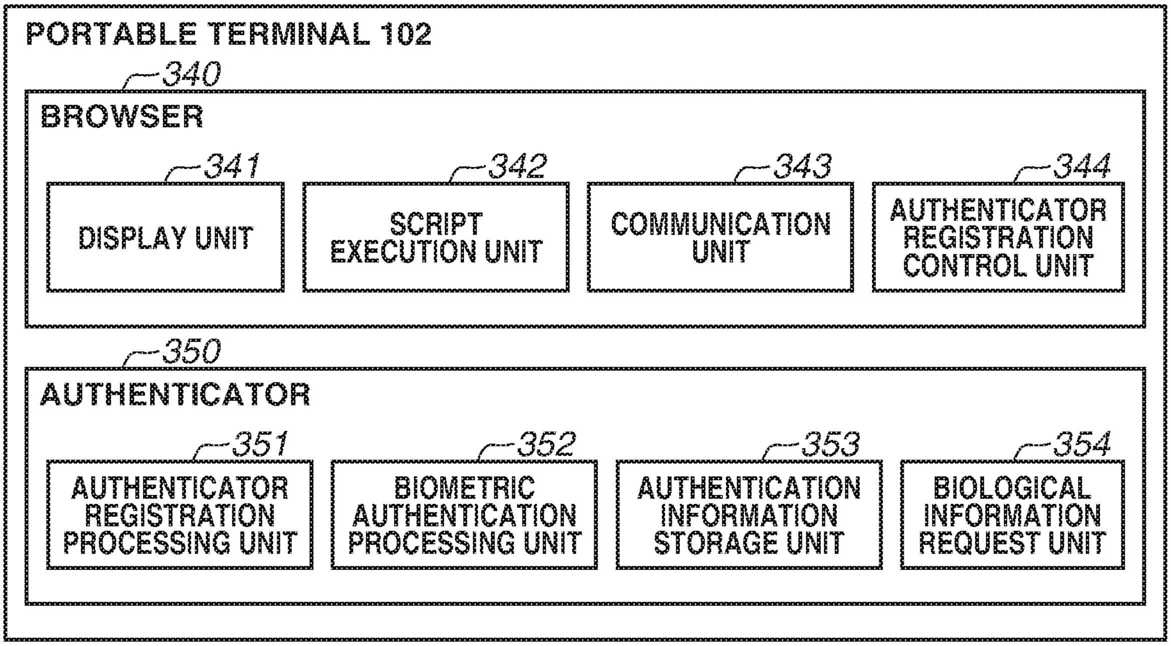

FIG. 3B is a block diagram illustrating an example of a functional configuration of the portable terminal 102.

In the portable terminal 102, a browser 340 and an authenticator 350 operate. The browser 340 and the authenticator 350 are implemented by the CPU 242 reading out a program stored in, for example, the ROM 244 included in the portable terminal 102 onto the RAM 243 and executing the read-out program.

The browser 340 includes a display unit 341, a script execution unit 342, a communication unit 343, and an authenticator registration control unit 344.

The display unit 341 is a software module which displays an HTML document acquired by the communication unit 343 or receives an operation of the user. The script execution unit 342 is a software module which analyzes JavaScript which, for example, the print service 370 of the print system 103 provides and executes the JavaScript. The communication unit 343 is a software module for communicating with an external apparatus, such as the print system 103. The authenticator registration control unit 344 is a software module which requests an authenticator to generate a credential described below. In the present exemplary embodiment, an example in which the authenticator registration control unit 344 requests the authenticator 350 to generate a credential is described.

The authenticator 350 is an authentication module which supports biometric authentication using the biological information sensor 248, and includes an authenticator registration processing unit 351, a biometric authentication processing unit 352, an authentication information storage unit 353, and a biological information request unit 354.

The authenticator registration processing unit 351 is a software module which receives a request for generation of a credential from, for example, the authenticator registration control unit 344 of the browser 340 and performs generation of a pair of keys (a private key and a public key) or generation of a credential. The biometric authentication processing unit 352 is a software module which receives a biometric authentication request from the biometric authentication control unit 303 of the browser 300 of the MFP 101 and performs biometric authentication. The authentication information storage unit 353 is a software module which stores authentication information, which is described below with reference to Table 1, The biological information request unit 354 is a software module which displays a UI for receiving inputting of biological information from the user.

<Functional Configuration of Print System>

Figure 3C:
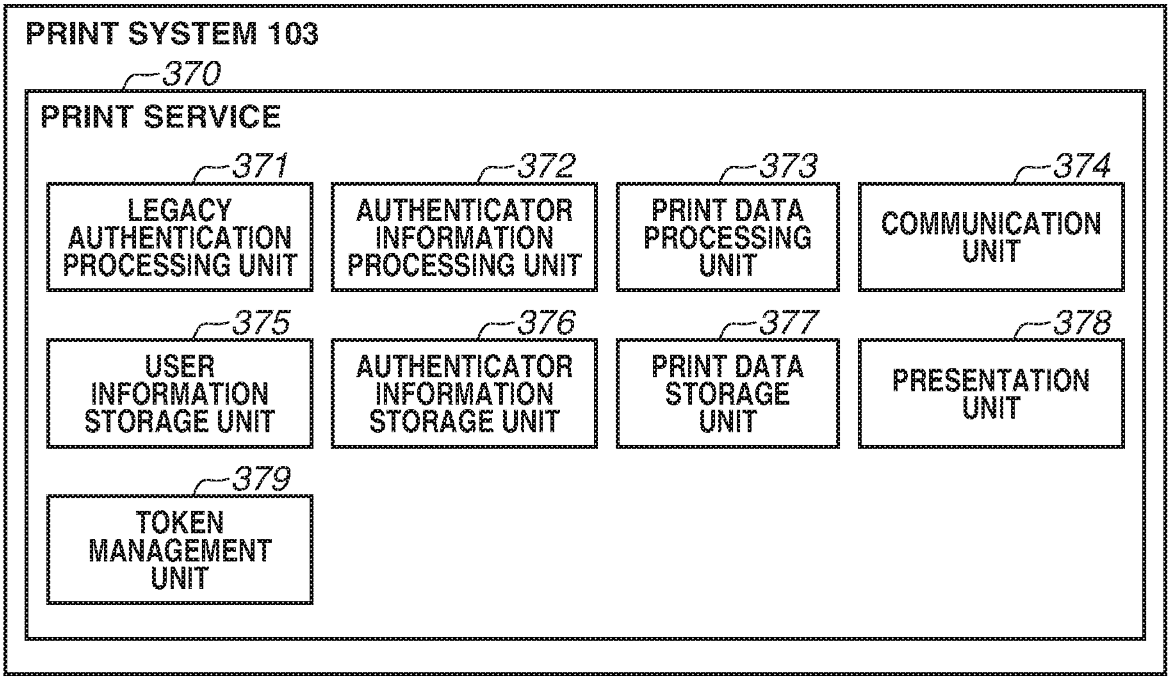

FIG. 3C is a block diagram illustrating an example of a functional configuration of the print system 103. In the print system 103, the print service 370 operates. The print service 370 is a web application (also referred to as a "World Wide Web application") which provides a service for pull printing, and is able to be used via a web browser. The print service 370 is implemented by the CPU 201 reading out a program stored in, for example, the external memory 210, which is included in a server PC (print system 103) which provides the print service 370, onto the RAM 202 and executing the read-out program. Furthermore, while, in the present exemplary embodiment, a print service is described as an example of the web application, the web application is not limited to a print service but can be a different service.

The print service 370 includes a legacy authentication processing unit 371, an authenticator information processing unit 372, a print data processing unit 373, and a communication unit 374. The print service 370 further includes a user information storage unit 375, an authenticator information storage unit 376, a print data storage unit 377, a presentation unit 378, and a token management unit 379.

Furthermore, in the present exemplary embodiment, to make a distinction from biometric authentication, authentication for verifying matching in user ID and password is referred to as "legacy authentication". The legacy authentication processing unit 371 is a software module which verifies whether a user ID and password included in a legacy authentication request received by the communication unit 374 match a user ID and password stored in the user information storage unit 375.

The authenticator information processing unit 372 is a software module which stores information about an authenticator in the authenticator information storage unit 376 with use of a credential received by the communication unit 374. Moreover, the authenticator information processing unit 372 verifies assertion information (assertion) described below received by the communication unit 374.

The print data processing unit 373 is a software module which registers print data with the print data storage unit 377 or acquires print data from the print data storage unit 377 in response to a request for registration or acquisition of print data received by the communication unit 374.

The communication unit 374 is a software module which performs communication with the MFP 101 or the portable terminal 102 and receives a request therefrom.

The user information storage unit 375 is a software module which stores user information described below with reference to Table 2, information about attestation challenges described below with reference to Table 4, and information about tokens described below with reference to Table 6, The authenticator information storage unit 376 is a software module which stores authenticator information described below with reference to Table 5. The print data storage unit 377 is a software module which stores print data described below with reference to Table 3. The presentation unit 378 is a software module which creates an HTML document in response to a screen acquisition request, such as an acquisition request for an authenticator registration screen, received by the communication unit 374. The token management unit 379 is a software module which performs issuance or verification of a token described below.

<Functional Configuration of Client PC>

Figure 3D:
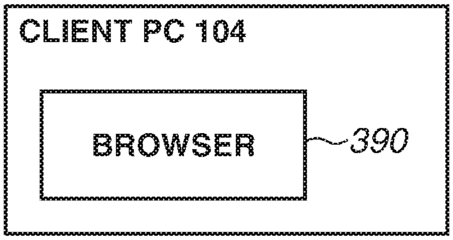

FIG. 3D is a block diagram illustrating an example of a functional configuration of the client PC 104. In the client PC 104, a browser 390 operates. The browser 390 is implemented by the CPU 201 reading out a program stored in, for example, the external memory 210 included in the client PC 104 onto the RAM 202 and executing the read-out program.

The browser 390 is a software module which displays the acquired HTML document or receives an operation performed by the user. The browser 390 is also a software module which communicates with an external apparatus such as the print system 103.

<Table Which Portable Terminal Manages>

Table 1 shows an example of an authentication information management table which the portable terminal 102 manages.

TABLE 1

| Authentication information ID | Service ID | Private key | Biological information ID |
|---|---|---|---|
| 407c-8841-79d | pull-print.com | 1faea2da-a269-4fa7-812a-509470d9a0cb | d493a744 |
| 92b2-498d-bea6 | service-a.com | 36ae5eed-732b-4b05-aa7b-4dddb4be3267 | 51caacaa |
| . . . | . . . | . . . | . . . |

Table 1 is an example of the authentication information management table and is stored in the authentication information storage unit 353 of the authenticator 350. In the authentication information management table, one record represents one entry of authentication information.

The authentication information ID column stores a unique II) for each piece of authentication information.

The service ID column stores an ID for uniquely identifying a service. While, in the present exemplary embodiment, the service ID column stores information about a top-level domain or a second-level domain, the present exemplary embodiment is not limited to this. For example, in a case where the Uniform Resource Locator (URL) of the print service 370 is "https://www.pull-print.com", "pull-print.com" is stored in the service ID column.

The private key column stores a private key. A public key corresponding to the private key stored in the private key column is retained by a service indicated in the service ID column.

The biological information ID column stores an ID of the feature amount of biological information.

A procedure for storing corresponding pieces of information in the respective columns of Table 1 and a procedure for storing a public key in the print system 103 are described below.

<Tables which Print System Manages>

Table 2 to Table 6 show examples of tables which the print system 103 manages.

TABLE 2

| User ID | Password | E-mail address |
|---|---|---|
| user001 | ************ | user001@co.jp |
| user004 | ************ | user004@co.jp |
| . . . | . . . | . . . |

Table 2 is an example of a user information management table and is stored in the user information storage unit 375 of the print service 370. In the user information management table, one record represents one piece of user information.

The user ID column stores an ID for uniquely identifying the user of the print service 370. The password column stores a password used for authenticating the user. The e-mail address column stores the e-mail address of the user. Besides an e-mail address, attribute information about the user, such as the address (domicile) of the user, can be stored in the present table.

TABLE 3

| Data name | Print data | User ID | Reservation code |
|---|---|---|---|
| Minutes-0501.doc | 010100101010101010 . . . | user001 | xbrgtaca |
| Minutes-0502.doc | 010100101010101111 . . . | user001 | adtcac12 |
| Contract-0501.doc | 011111010110110111 . . . | user001 | tdcca876 |
| . . . | . . . | . . . | . . . |

Table 3 is an example of a print data management table and is stored in the print data storage unit 377 of the print service 370. In the print data management table, one records represents one piece of print data.

The data name column stores the name of data which the user printed. The present name becomes a name which is displayed on the MFP 101 in a print flow described below.

The print data column stores binary data about print data to be printed.

The user ID column stores an ID uniquely indicating the user of the print service 370 who issued an instruction for printing.

The reservation code column stores a reservation code for uniquely identifying print data. The reservation code is used to identify print data to be printed, by being designated by the user in the MFP 101.

TABLE 4

| Attestation challenge | User ID | Expiration date |
|---|---|---|
| 65C9B063-9C33 | user001 | 2017-05-02T12:00:34Z |
| 7317EFBA-4E63 | user101 | 2017-05-02T12:03:12Z |
| . . . | . . . | . . . |

Table 4 is an example of an attestation challenge management table and is stored in the user information storage unit 375 of the print service 370. In the attestation challenge management table, one record represents information about one attestation challenge. The attestation challenge is a parameter which is used to perform challenge response authentication, and is issued for each user. Issuance processing for an attestation challenge is described below.

The attestation challenge column stores an attestation challenge.

The user ID column stores a user ID of the user who issued the attestation challenge.

The expiration date column stores the expiration date of the attestation challenge.

TABLE 5

| Authentication information ID | Public key | User ID |
|---|---|---|
| 407c-8841-79d | AC43C5FB-BFA2-48D1-A71B-FB04ACDA347A | user001 |
| 4c04-428b-a7a2 | B143CA9F-35C9-4333-948F-BFCE66A74310 | user002 |
| . . . | . . . | . . . |

Table 5 is an example of an authenticator information management table and is stored in the authenticator information storage unit 376 of the print service 370. In the authenticator information management table, one record represents one piece of authenticator information.

The authentication information ID column stores the value of the authentication information ID column in Table 1.

The public key column stores a public key which is paired with a private key in Table 1 generated by the authenticator. Thus, this means that, with regard to a private key and a public key which are the same in authentication information ID in Table 1 and Table 5, what is encrypted with the private key in Table 1 can be decrypted with the public key in Table 5.

The user ID column stores an ID for uniquely identifying the user of the print service 370.

TABLE 6

| Token | User ID | Expiration date |
|---|---|---|
| 3FD4FA-AA4-56DC-B45F-45BCD65AC45D | user001 | 2017-05-02T13:14:31Z |
| EC51DC-36C4-4BC3-54CF-31ECE6CACBF0 | user003 | 2017-05-02T13:31:32Z |
| . . . | . . . | . . . |

Table 6 is an example of a token management table and is stored in the user information storage unit 375 of the print service 370. The token is issued by the print service 370 as a result of authentication processing being successful. For example, the browser 300 of the MFP 101 adds the issued token to a print data list request and then transmits the print data list request with the token added thereto to the print service 370. These processing operations are described below with reference to FIG. 9. In the token management table, one record represents information about one token. The token column stores a token. The user ID column stores an ID for uniquely identifying the user of the print service 370. The expiration date column indicates the expiration date of the token. The print service 370 accepts the request in a case where the token added to the request is present in the token column of the token management table and does not yet exceed the expiration date in the expiration date column.

<Registration Processing of Print Data>

Registration of print data transmitted from the client PC 104 is described with reference to FIG. 4 and FIGS. 5A and 5B.

Figure 4:
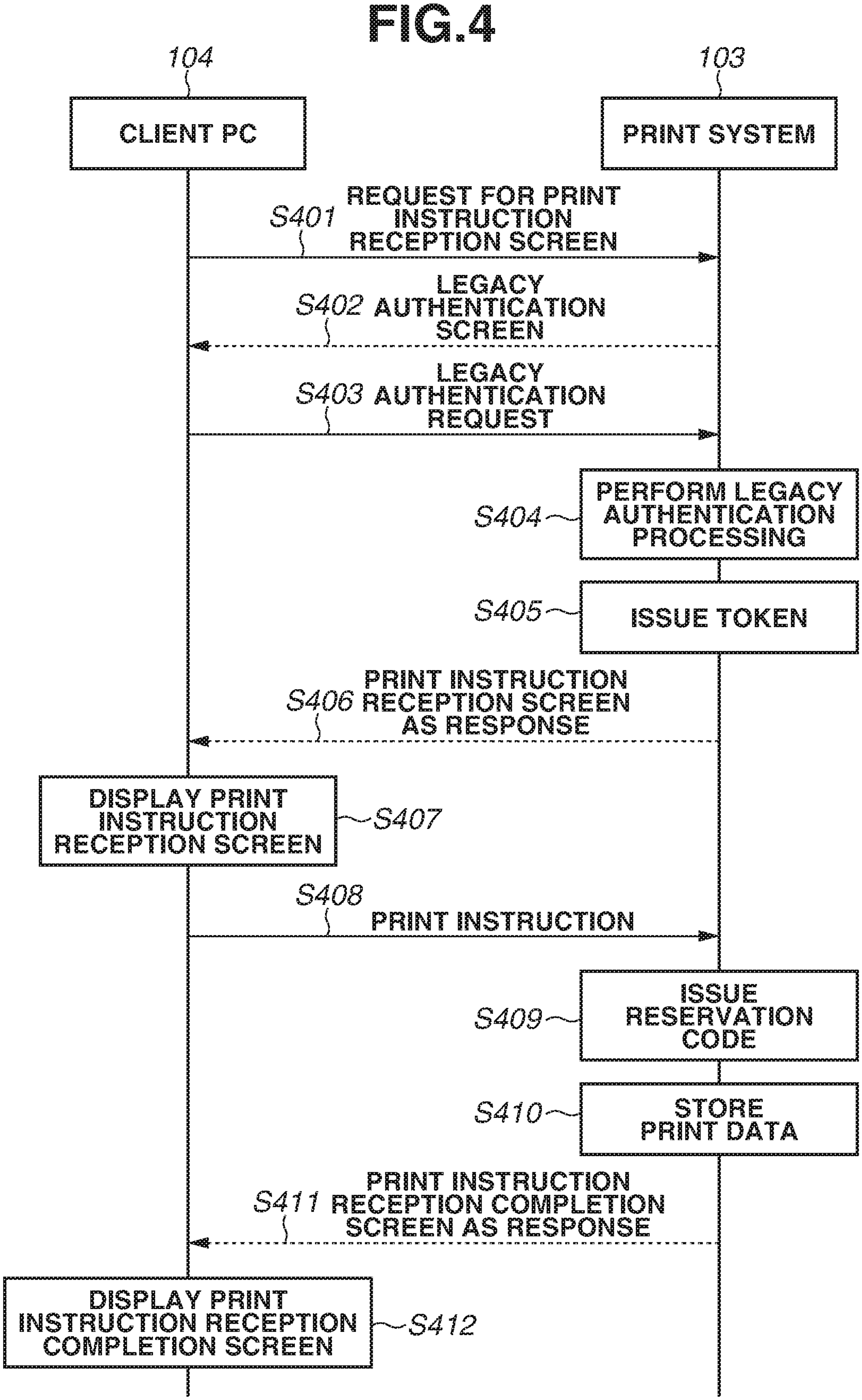
FIG. 4 is a sequence diagram illustrating an example of registration processing for print data.

FIG. 4 is a sequence diagram illustrating an example of print data registration processing which is performed by the print system 103 and the client PC 104. Furthermore, in FIG. 4, the processing which is performed by the client PC 104 is implemented by the CPU 201 of the client PC 104 reading out a program stored in, for example, the external memory 210 onto the RAM 202 and executing the read-out program. Moreover, the processing which is performed by the print system 103 is implemented by the CPU 201 of the server PC which provides the print system 103 reading out a program stored in, for example, the external memory 210 onto the RAM 202 and executing the read-out program.

First, the user performs inputting of the URL of a print instruction reception screen to the browser 390 of the client PC 104.

In step S401, the browser 390 of the client PC 104 receives inputting of the URL of a print instruction reception screen and then transmits a request for the print instruction reception screen to the print service 370. Since, at the first access, authentication is not yet performed, the request is redirected to a legacy authentication screen. Then, in step S402, the print system 103 returns the legacy authentication screen to the browser 390. Upon receiving the legacy authentication screen, the browser 390 display the legacy authentication screen to receive inputting of a user ID and a password.

Then, upon receiving inputting of a user ID and a password performed by a user operation, in step S403, the browser 390 transmits a legacy authentication request with the received user ID and password used as parameters to the print service 370.

Upon receiving the legacy authentication request, in step S404, the legacy authentication processing unit 371 of the print service 370 performs a legacy authentication based on the legacy authentication request. Specifically, the legacy authentication processing unit 371 verifies whether the user ID and password included in the legacy authentication request and a user ID and password, described with reference to Table 2, stored in the user information storage unit 375 match each other. If those do not match each other, the print service 370 returns an authentication error message to the browser 390 of the client PC 104.

In the sequence diagram of FIG. 4, a case where the legacy authentication is successful is described.

Upon success of the legacy authentication, in step S405, the token management unit 379 of the print service 370 issues a token and stores information about the issued token in the token management table of the user information storage unit 375 described with reference to Table 6.

Next, in step S406, the communication unit 374 of the print service 370 transmits a print instruction reception screen generated by the presentation unit 378 to the browser 390 of the client PC 104 as a response. Furthermore, the communication unit 374 causes the token issued in step S405 to be included in the response to be transmitted in step S406. For example, the communication unit 374 sets the token in a cookie.

Figure 5A:
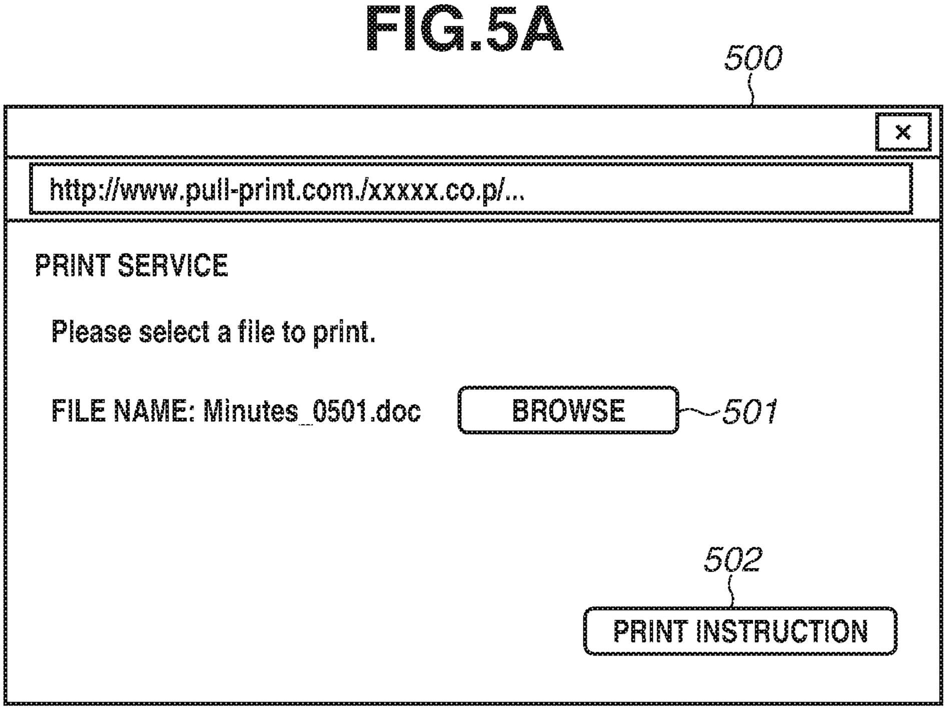
FIGS. 5A and 5B are diagrams illustrating examples of user interfaces UIs each of which is displayed on a client personal computer (PC).

Upon receiving the print instruction reception screen, in step S407, the browser 390 displays the print instruction reception screen such as that illustrated in FIG. 5A.

Here, the print instruction reception screen is described with reference to FIG. 5A.

FIG. 5A is a diagram illustrating an example of the print instruction reception screen.

In FIG. 5A, a UI 500 represents the print instruction reception screen. The browser 390 displays the UI 500 by analyzing an HTML document included in the print instruction reception screen received as a response in step S406 illustrated in FIG. 4.

A button 501 is a button used to select a file targeted for printing.

A button 502 is a button used to issue a print instruction to the print service 370 of the print system 103.

Subsequent description refers back to that of FIG. 4.

Upon receiving pressing of the button 502, the browser 390 advances the processing to step S408.

In step S408, the browser 390 makes a request of print instruction to the print service 370 of the print system 103. The request of print instruction includes print data of a file targeted for printing and the token received in step S406. The token included in the request of print instruction is used for the token management unit 379 of the print service 370 to verify whether that token is valid. Specifically, the token management unit 379 of the print service 370 checks whether the token included in the request of print instruction is present in the token management table described with reference to Table 6 and does not exceed the expiration date thereof. The token which is present in the token management table and does not exceed the expiration date thereof is determined to be a valid token. On the other hand, the token which is not present in the token management table or exceeds the expiration date thereof is determined to be an invalid token. In a case where the token is invalid, the print service 370 returns an error message to the browser 390 of the client PC 104.

Furthermore, in the sequence diagram of FIG. 4, a case where the token is valid is described. In a case where the token is valid, the print service 370 advances the processing to step S409.

In step S409, the print data processing unit 373 of the print service 370 issues a reservation code.

Next, in step S410, the print data processing unit 373 of the print service 370 stores the reservation code issued in step S409 and the print data received in step S407 in the print data management table described with reference to Table 3.

Next, in step S411, the communication unit 374 of the print service 370 transmits, as a response, a print instruction reception completion screen generated by the presentation unit 378 to the browser 390 of the client PC 104.

Upon receiving the print instruction reception completion screen, in step S412, the browser 390 displays the print instruction reception completion screen.

The print instruction reception completion screen is described with reference to FIG. 5B.

Figure 5B:
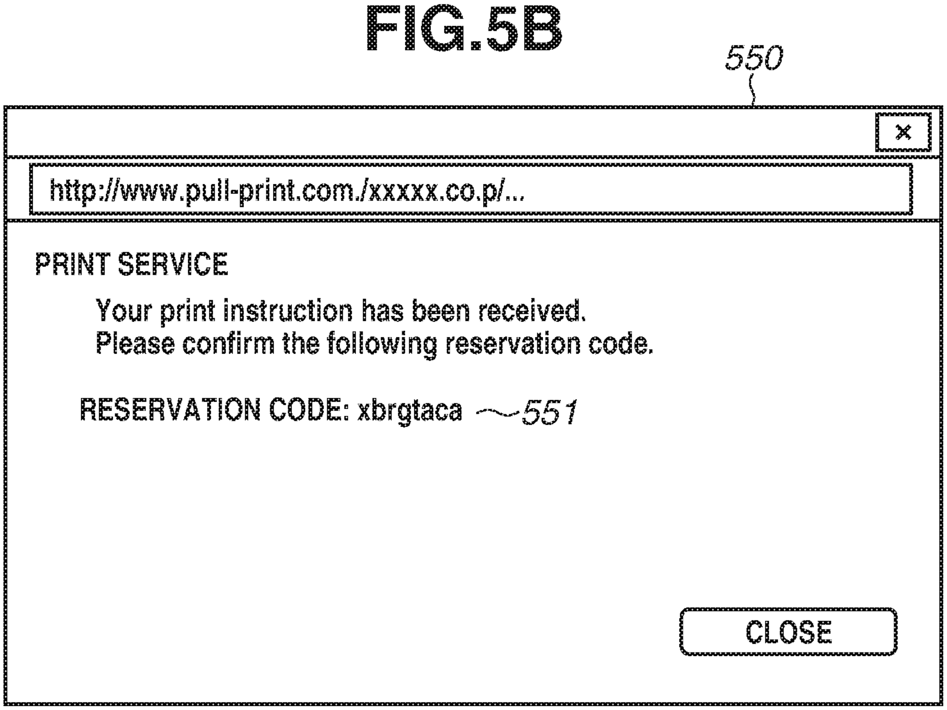

FIG. 5B is a diagram illustrating an example of the print instruction reception completion screen.

A UI 550 represents the print instruction reception completion screen. The browser 390 displays the UI 550 by analyzing an HTML document included in the print instruction reception completion screen received as a response in step S411 illustrated in FIG. 4.

A text area 551 indicates a reservation code of print data for which a print instruction has been received. Using the reservation code enables designating print data. Designating print data using a reservation code is described below.

Furthermore, while, in the present example, the browser 390 of the client PC 104 performs registration processing of print data, in the case of, for example, printing a file stored in the portable terminal 102, the browser 340 of the portable terminal 102 can perform the registration processing. Moreover, the print service 370 can communicate the reservation code to the e-mail address of a user who has succeeded in legacy authentication in step S404 illustrated in FIG. 4.

<Registration Processing of Authenticator>

Processing for registering an authenticator with the print service 370 of the print system 103 is described with reference to FIG. 6 to FIG. 8.

Figure 6:
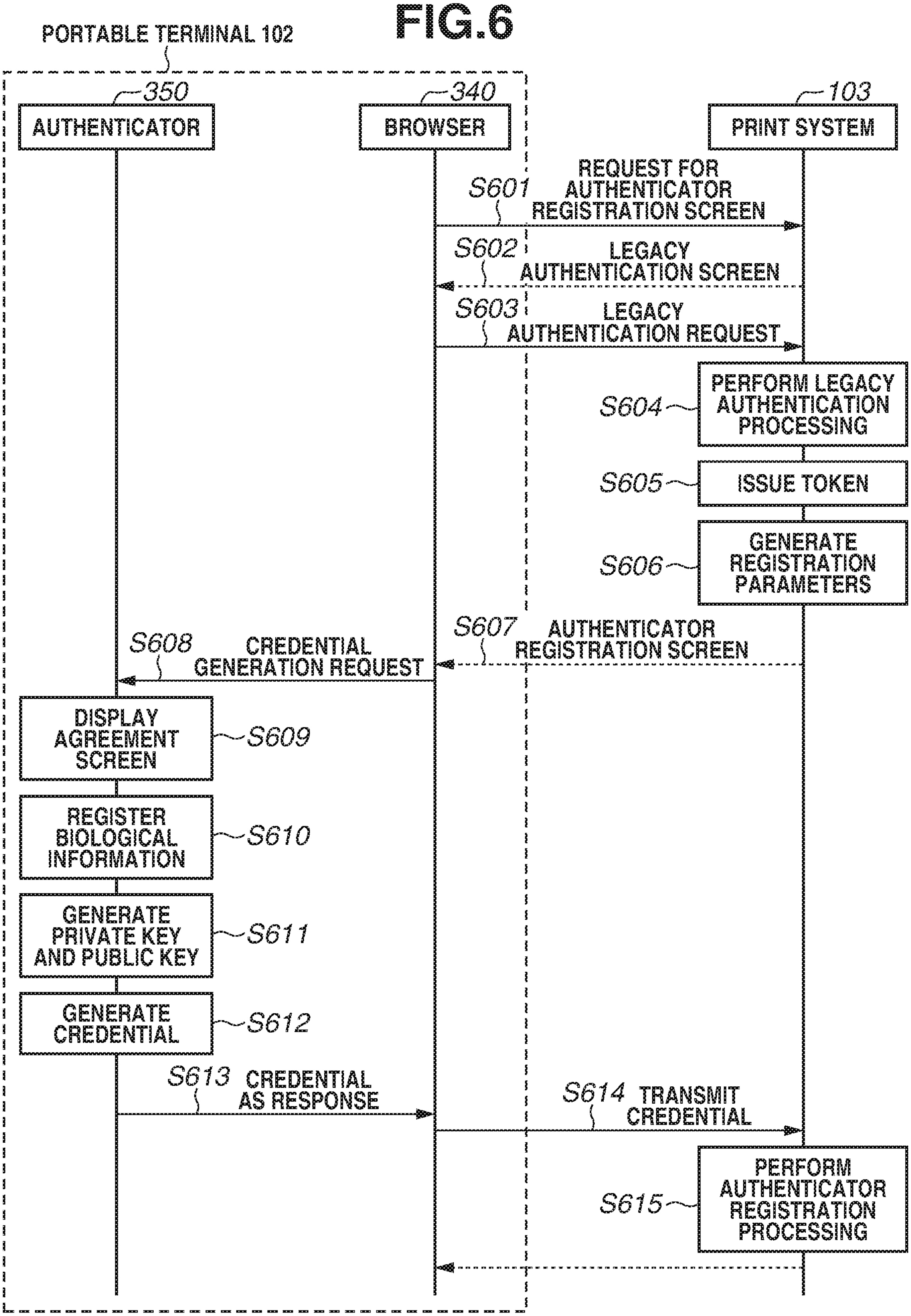
FIG. 6 is a sequence diagram illustrating an example of registration processing for an authenticator.

FIG. 6 is a sequence diagram illustrating an example of processing which is performed by the portable terminal 102 and the print system 103 with respect to registration of an authenticator. Furthermore, in FIG. 6, processing which is performed by the portable terminal 102 is implemented by the CPU 242 of the portable terminal 102 reading out a program stored in, for example, the ROM 244 onto the RAM 243 and executing the read-out program. Moreover, processing which is performed by the print system 103 is implemented by the CPU 201 of a server PC which provides the print system 103 reading out a program stored in, for example, the external memory 210 onto the RAM 202 and executing the read-out program.

First, the user performs inputting of the URL of an authenticator registration screen to the browser 340 of the portable terminal 102.

In step S601, the browser 340 of the portable terminal 102 receives inputting of the URL of an authenticator registration screen and then transmits a request for the authenticator registration screen to the print service 370. Since, at the first access, authentication is not yet performed, the request is redirected to a legacy authentication screen. Then, in step S602, the print system 103 returns the legacy authentication screen to the browser 340.

Upon receiving the legacy authentication screen, the display unit 341 of the browser 340 display the legacy authentication screen (not illustrated) to receive inputting of a user ID and a password.

Upon receiving inputting of a user ID and a password performed by a user operation, in step S603, the communication unit 343 of the browser 340 transmits a legacy authentication request with the received user ID and password used as parameters to the print service 370.

Upon receiving the legacy authentication request, in step S604, the legacy authentication processing unit 371 of the print service 370 performs a legacy authentication. If the result of the legacy authentication is an error, the print system 103 returns an authentication error message to the browser 340 of the portable terminal 102. If the result of the legacy authentication is OK, the print system 103 advances the processing to step S605. Furthermore, in the sequence diagram of FIG. 6, a case where the legacy authentication is successful is described.

In step S605, the token management unit 379 of the print service 370 issues a token and stores information about the issued token in the token management table of the user information storage unit 375 described with reference to Table 6.

Next, in step S606, the authenticator information processing unit 372 generates registration parameters 700.

Here, registration parameters are described with reference to FIG. 7A.

Figure 7A:
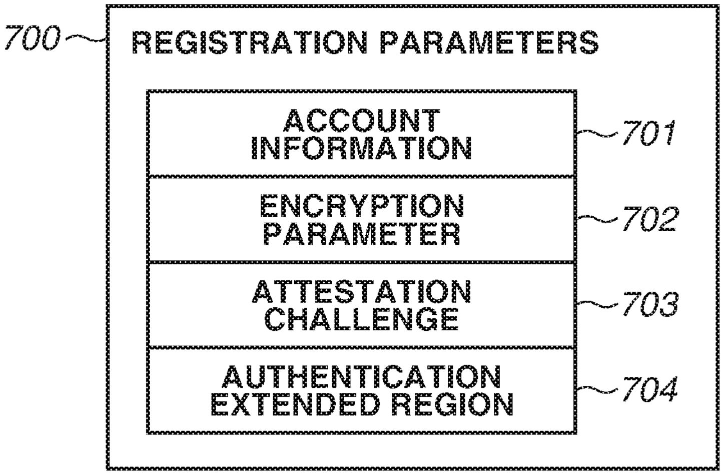
FIGS. 7A, 7B, and 7C are diagrams illustrating examples of parameters for registration for the authenticator.

FIG. 7A is a diagram illustrating an example of registration parameters.

As illustrated in FIG. 7A, the registration parameters 700 include account information 701, an encryption parameter 702, an attestation challenge 703, and an authentication extended region 704.

The account information 701 represents attribute information such as a user ID identified by the legacy authentication performed in step S604 illustrated in FIG. 6 and an e-mail address associated with the user ID, in the print server 370. The encryption parameter 702 represents attribute information about authentication information to be registered, such as an encryption algorithm which the print service 370 supports. The attestation challenge 703 is a parameter which is used to perform challenge response authentication. The attestation challenge is generated at the time of generation of registration parameters in step S606 illustrated in FIG. 6 and is then stored in the attestation challenge management table described with reference to Table 4. The authentication extended region 704 is used to store therein an extended parameter which the print service 370 is able to designate to enable the print service 370 to control an operation of, for example, the authenticator 350.

Subsequent description refers back to that of FIG. 6.

In step S607, the communication unit 374 of the print service 370 transmits an authenticator registration screen generated by the presentation unit 378 to the browser 340 of the portable terminal 102 as a response. The response to be transmitted in step S607 includes the token issued in step S605 and the registration parameters 700.

Upon receiving the authenticator registration screen, in step S608, the authenticator registration control unit 344 of the browser 340 makes a credential generation request to the authenticator 350. The processing in step S608 is performed when the display unit 341 of the browser 340 has read the authenticator registration screen. For example, when the script execution unit 342 of the browser 340 has detected an onload event, the processing in step S608 is performed. The credential generation request in step S608 includes registration request data 720. Here, the registration request data 720 is described with reference to FIG. 7B.

Figure 7B:
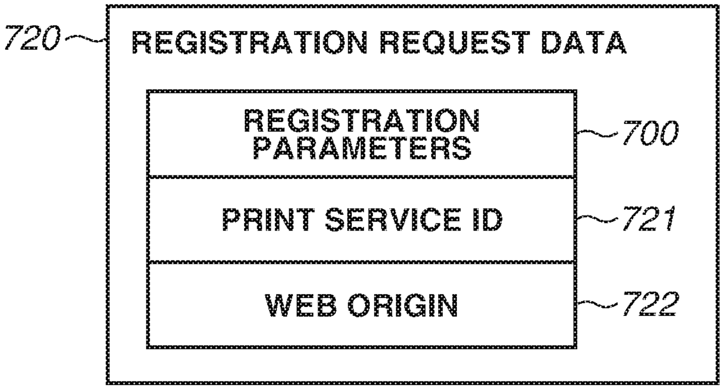

FIG. 7B is a diagram illustrating an example of the registration request data 720.

As illustrated in FIG. 7B, the registration request data 720 includes registration parameters 700, a print service ID 721, and a web origin 722.

The web origin 722 is an origin of the print service 370.

The print service ID 721 stores information about a top-level domain and a second-level domain of the print service 370. For example, in a case where the URL of the print service 370 is "https://www.pull-print.com", the print service ID 721 becomes "pull-print.com".

Subsequent description refers back to that of FIG. 6.

Figure 8:
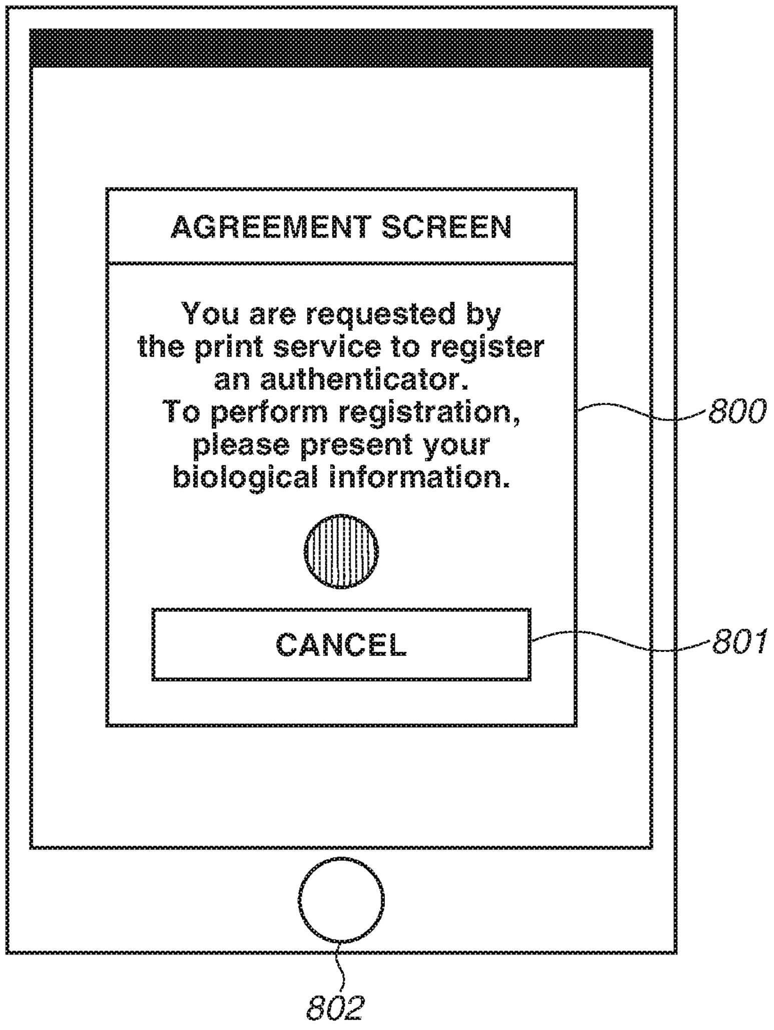
FIG. 8 is a diagram illustrating an example of a UI of a portable terminal at the time of registration for the authenticator.

In step S609, the biological information request unit 354 of the authenticator 350 displays an agreement screen 800 such as that illustrated in FIG. 8. Here, the agreement screen 800 is described with reference to FIG. 8.

FIG. 8 is a diagram illustrating an example of the agreement screen 800.

The agreement screen 800 prompts the user to present biological information about the user to register the authenticator 350 with the print service 370.

A button 801 is a button used to make a cancellation without entering an agreement.

A button 802 is provided with a biological information sensor 248, which performs reading of biological information. The biological information includes, for example, information about a fingerprint, a vein, an iris, a voiceprint, and a face image, and, here, the portable terminal 102 can be structured in such a way as to input, as biological information required for authentication, any one of these pieces of biological information or a combination of an optional plurality of pieces of biological information.

When reading of biological information is performed by the biological information sensor 248, the authenticator 350 performs processing in step S610.

Subsequent description refers back to that of FIG. 6.

In step S610, the authentication information storage unit 353 generates a feature amount of the read biological information and a biological information ID for uniquely identifying the biological information, and then stores the feature amount and the biological information ID in the TPM 246.

Next, in step S611, the authenticator registration processing unit 351 generates a pair of a private key and a public key and an authentication information ID. Then, the authenticator registration processing unit 351 stores the authentication information ID and the private key generated in step S611, the biological information ID generated in step S610, and the print service ID 721 included in the registration request data 720 in the authentication information management table (Table 1) on the TPM 246.

Figure 7C:
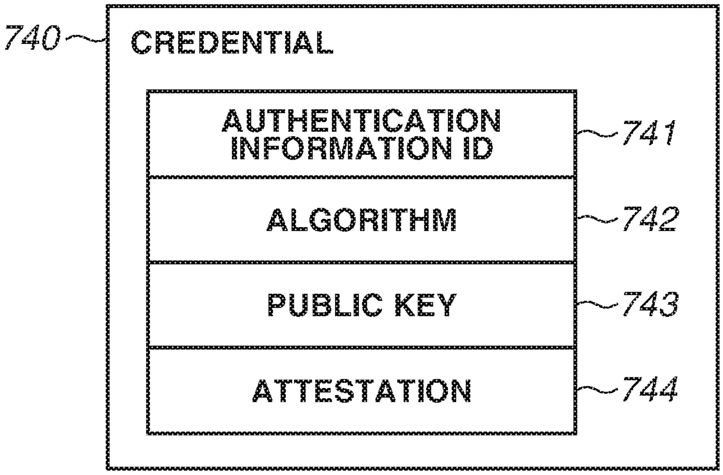

In step S612, the authenticator registration processing unit 351 generates a credential 740 illustrated in FIG. 7C. Here, the credential 740 is described with reference to FIG. 7C.

FIG. 7C is a diagram illustrating an example of the credential 740.

As illustrated in FIG. 7C, the credential 740 includes an authentication information ID 741, an algorithm 742, a public key 743, and an attestation 744.

The authentication information ID 741 and the public key 743 correspond to the authentication information ID and the public key generated in the processing in step S611, respectively. The algorithm 742 corresponds to an algorithm which has been used to generate the pair of a private key and a public key in step S611. Moreover, the attestation 744 is obtained by encrypting the attestation challenge 703 using the secret key generated in step S611.

Next, in step S613, the authenticator registration processing unit 351 of the authenticator 350 transfers, as a response, the credential 740 generated in step S612 to the browser 340. Upon receiving the credential 740, the browser 340 advances the processing to step S614.

In step S614, the communication unit 343 of the browser 340 transmits the credential 740 received in step S613 to the print service 370 of the print system 103. Upon receiving the credential 740, the print service 370 advances the processing to step S615.

In step S615, the authenticator information processing unit 372 of the print service 370 performs authenticator registration processing using the credential 740. Here, the authenticator information processing unit 372 decrypts the attestation 744 included in the credential 740 with the public key 743 included in the same credential 740, thus verifying whether the registration request is not an unauthorized request. Additionally, the authenticator information processing unit 372 of the print service 370 identities a record in which a value obtained by decrypting the attestation 744 is identical with a value in the attestation challenge column in Table 4. Then, the authenticator information processing unit 372 sets the user ID of the identified record in which the decrypted value is identical with a value in the attestation challenge column as a user ID which is to be associated with the credential 740. The authenticator information processing unit 372 of the print service 370 registers the authenticator information ID 741 and the public key 743 included in the credential 740 and the user ID which is to be associated with the credential 740 in the authenticator information management table (Table 5). Finally, the communication unit 374 of the print service 370 transmits a response indicating that registration of the biological information has been normally completed to the browser 340 of the portable terminal 102.

<Print Processing to be Performed by MFP>

Next, processing which MFP 101 performs to acquire print data from the print system 103 and then print the print data is described with reference to FIG. 9 to FIGS. 12A and 12B. Here, an example in which authentication with the print system 103 is performed with use of the portable terminal 102 is described.

Figure 9:
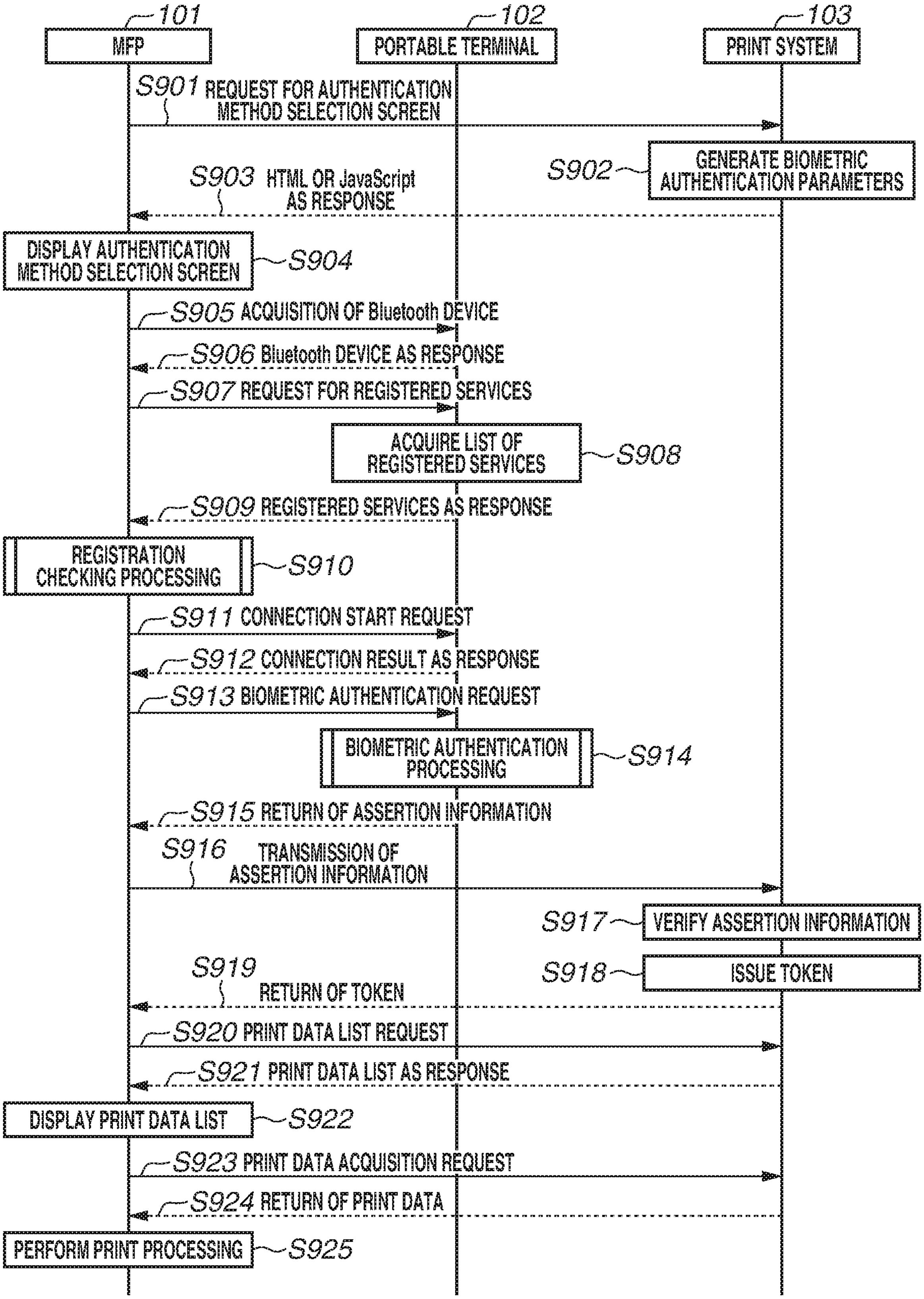
FIG. 9 is a sequence diagram illustrating an example of print processing for print data in a first exemplary embodiment.

FIG. 9 is a sequence diagram illustrating an example of print processing of print data in the first exemplary embodiment. Furthermore, in FIG. 9, processing which is performed by the MFP 101 is implemented by the CPU 221 of the MFP 101 reading out a program stored in, for example, the ROM 223 onto the RAM 222 and executing the read-out program. Moreover, processing which is performed by the portable terminal 102 is implemented by the CPU 242 of the portable terminal 102 reading out a program stored in, for example, the ROM 244 onto the RAM 243 and executing the read-out program. Moreover, processing which is performed by the print system 103 is implemented by the CPU 201 of a server PC which provides the print system 103 reading out a program stored in, for example, the external memory 210 onto the RAM 202 and executing the read-out program.

First, the user performs inputting of the URL of an authentication method selection screen on the browser 300 of the MFP 101. Alternatively, a shortcut button can be provided on the UI of the MFP 101, and a configuration in which, when the shortcut button is pressed, the URL of an authentication method selection screen is requested can be employed.

In step S901, the browser 300 of the MFP 101 receives inputting of the URL of an authentication method selection screen and makes a request for the authentication method selection screen to the print service 370 of the print system 103. Upon receiving the request for the authentication method selection screen, the print service 370 advances the processing to step S902.

Figure 11A:
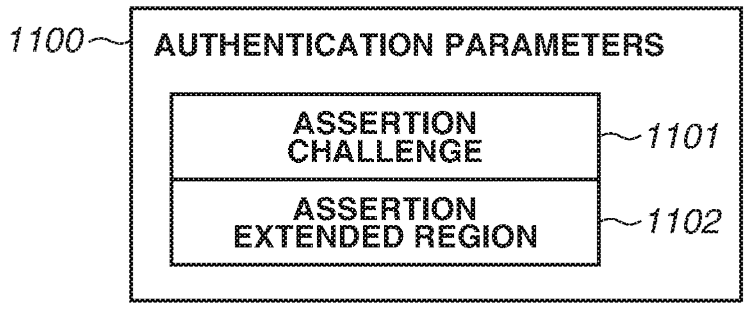
FIGS. 11A, 11B, and 11C are diagrams illustrating examples of parameters at the time of biometric authentication.

In step S902, the authenticator information processing unit 372 of the print service 370 generates biometric authentication parameters (authentication parameters 1100 illustrated in FIG. 11A). Here, the authentication parameters 1100 are described with reference to FIG. 11A.

FIG. 11A is a diagram illustrating an example of the authentication parameters 1100.

As illustrated in FIG. 1, the authentication parameters 1100 include an assertion challenge 1101 and an assertion extended region 1102.

The assertion challenge 1101 is a parameter serving as verification data which is used to perform challenge response authentication. The assertion extended region 1102 stores therein an extended parameter which the print service 370 is able to designate to enable the print service 370 to control an operation of the authenticator 350.

Subsequent description refers back to that of FIG. 9.

Next, in step S903, the communication unit 374 of the print service 370 returns HTML or JavaScript including the authentication parameters 1100 generated in step S902 to the MFP 101. The JavaScript to be returned includes JavaScript for invoking the Bluetooth control unit 304 of the browser 300. Moreover, HTML to be returned in step S903 is an authentication method selection screen. Upon receiving the HTML or JavaScript, the browser 300 of the MFP 101 advances the processing to step S904.

Figure 10A:
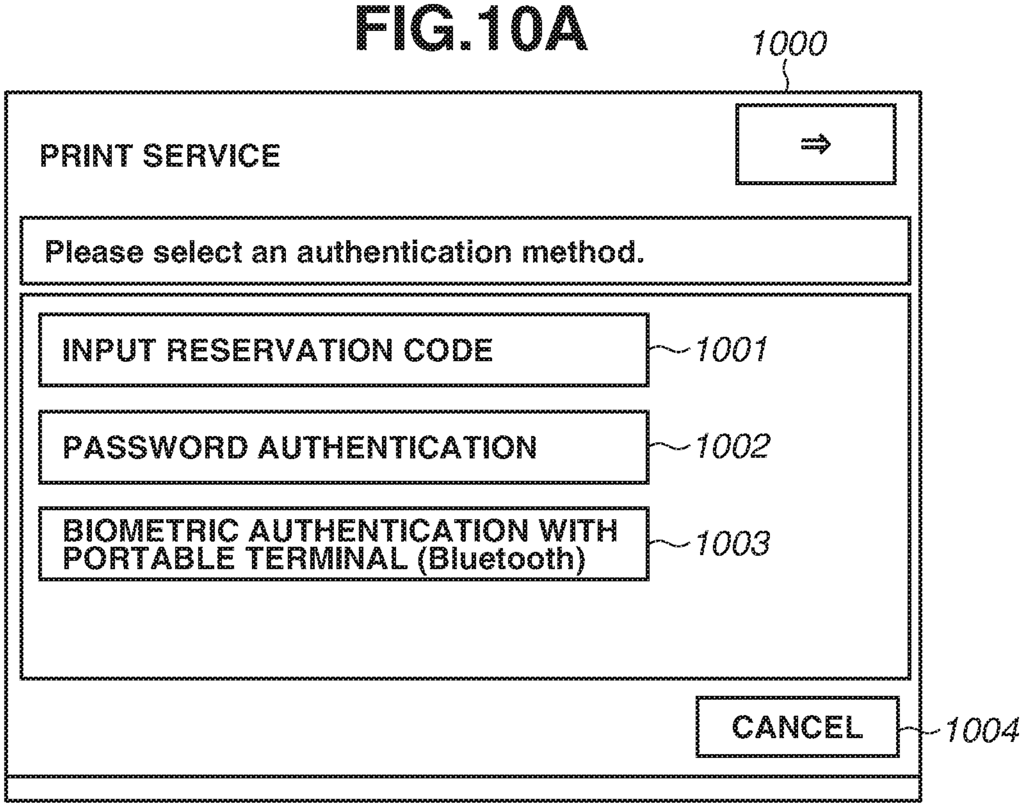
FIGS. 10A and 10B are diagrams illustrating examples of UIs of a multifunction peripheral (MFP) in the first exemplary embodiment.

In step S904, the display unit 301 of the browser 300 displays an authentication method selection screen such as that illustrated in FIG. 10A with use of the received HTML or JavaScript. Here, the authentication method selection screen is described with reference to FIG. 10A.

FIG. 10A is a diagram illustrating an example of the authentication method selection screen.

As illustrated in FIG. 10A, the authentication method selection screen 1000 includes buttons 1001 to 1004.

The button 1001 is a button used to acquire print data by inputting a reservation code. In a case where the user has selected the button 1001, in response to this selection, an acquisition request for print data in which a reservation code input by the user is included is transmitted from the MFP 101 to the print system 103. The print system 103 transmits, as a response, print data which matches the reservation code based on the print data management table (Table 3) to the MFP 101. In the MFP 101, print processing of the print data is performed.

The button 1002 is a button used to perform legacy authentication. In a case where the user has selected the button 1002, instead of a method using biometric authentication described below, a legacy authentication similar to that described in steps S602 to S604 illustrated in FIG. 6 is performed between the MFP 101 and the print system 103. In a case where the legacy authentication is successful, the MFP 101 is able to acquire, from the print system 103, a list of pieces of print data corresponding to the user ID of an authenticated user, which have been managed in the print data management table (Table 3).

The button 1003 is a button used to perform biometric authentication at a portable terminal which has communicated with the MFP 101 by Bluetooth. In a case where biometric authentication is successful, the MFP 101 is able to acquire, from the print system 103, a list of pieces of print data corresponding to the user ID of an authenticated user. Furthermore, in the sequence diagram of FIG. 9, an example in which the button 1003 has been pressed is described. The button 1004 is a button used to cancel the operation. Upon receiving pressing of the button 1003, the display unit 301 of the browser 300 advances the processing to step S905.

In step S905, the script execution unit 302 of the browser 300 analyzes JavaScript and invokes the Bluetooth control unit 304. Then, the Bluetooth control unit 304 acquires a device equipped with Bluetooth. For example, the script execution unit 302 invokes requestDevice of WebBluetooth API. In requestDevice, since a filter is configured with a function with which the device is compatible, the Bluetooth control unit 304 acquires a device equipped with Bluetooth compatible with FIDO.

In step S906, in response to a request from the Bluetooth control unit 304, the portable terminal 102, which is a device equipped with Bluetooth compatible with FIDO, transmits a response to the browser 300 of the MFP 101. The browser 300 receives the transmitted response. In a case where FIDO is included in the filter, the script execution unit 302 of the browser 300 does not display a screen used to request permission from the user, and then advances the processing to step S907.

In step S907, the communication unit 306 of the browser 300 makes a request for a list of services which are registered as authenticators, to the authenticator 350 of the portable terminal 102, which has transmitted the response. The authenticator 350 of the portable terminal 102, which has received the request, performs processing in step S908.

In step S908, the authenticator 350 of the portable terminal 102 acquires a list of service IDs in the authentication information management table (Table 1) stored in the authentication information storage unit 353. The list of service IDs corresponds to a list of pieces of information about services for which public keys corresponding to private keys related to authentication performed at the portable terminal 102 are registered.

Next, in step S909. The authenticator 350 of the portable terminal 102 transmits, as a response to the browser 300 of the MFP 101, the list of service IDs acquired in step S908 as a list of services which are registered as authenticators. The browser 300, which has received the transmitted response, advances the processing to step S910.

In step S910, the script execution unit 302 of the browser 300 performs registration checking processing (FIG. 12A) for checking whether the service which is requesting access to the device equipped with Bluetooth is a service registered as an authenticator. Details of the registration checking processing are described with reference to FIG. 12A.

Figure 12A:
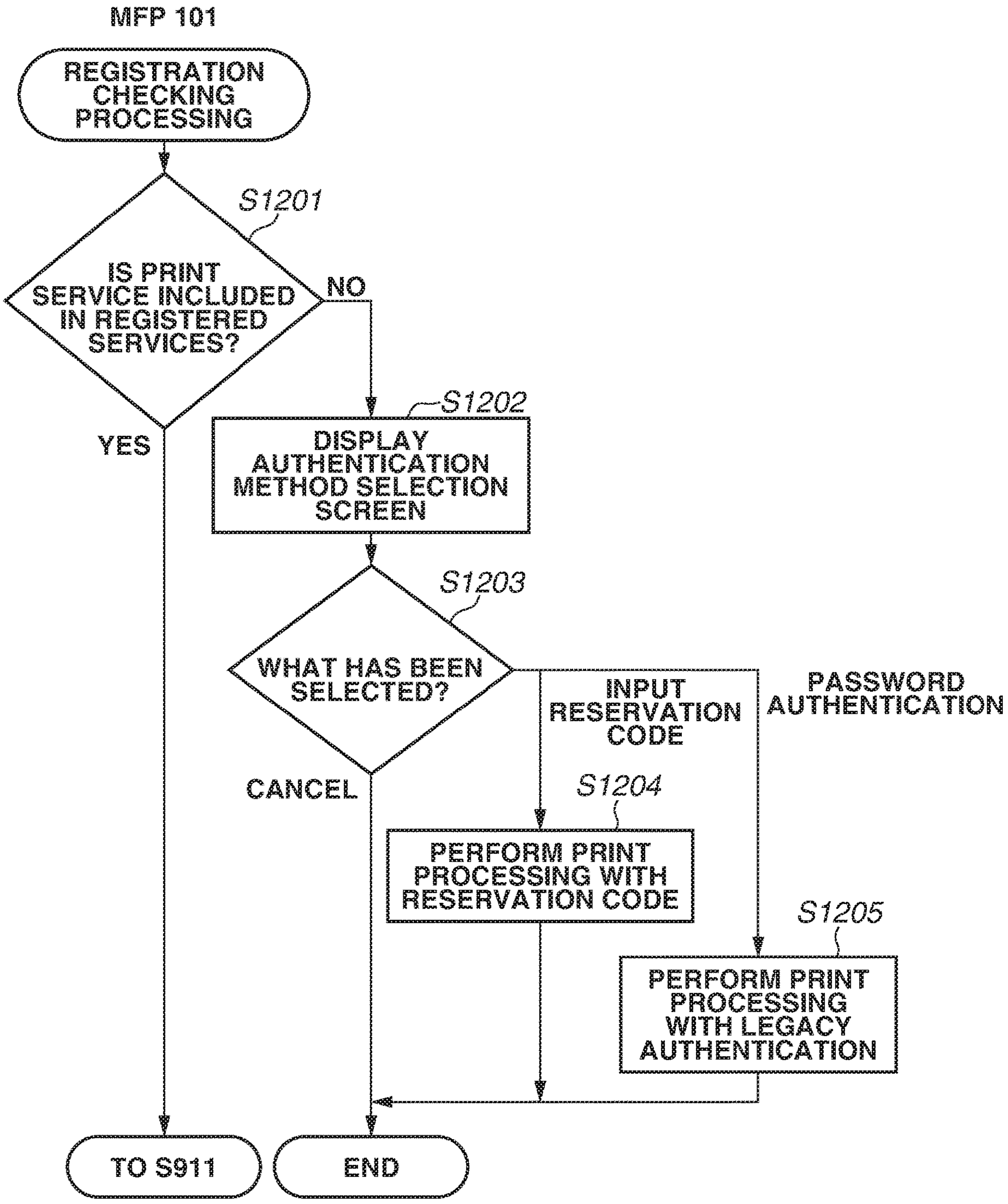
FIGS. 12A and 12B are flowcharts illustrating examples of registration checking processing and biometric authentication processing, respectively.

FIG. 12A is a flowchart, illustrating the registration checking processing, which is performed in the MFP 101. Processing in the flowchart of FIG. 12A is implemented by the CPU 221 of the MFP 101 reading out a program stored in, for example, the ROM 223 onto the d executing the read-out program.

In step S1201, the script execution unit 302 of the browser 300 checks whether the service ID of the print service 370 which has transmitted HTML or JavaScript as a response in step S903 illustrated in FIG. 9 is included in the list of registered services acquired in step S909 illustrated in FIG. 9. Then, if it is determined that the service ID of the print service 370 is included in the list of registered services (i.e., the print service 370 is a registered service) (YES in step S1201), the script execution unit 302 advances the processing to step S911 illustrated in FIG. 9. In this case, a sequence of the print processing illustrated in FIG. 9 is continued, and, without a permission prompt being displayed, access to the portable terminal 102 is permitted, so that biometric authentication processing described below is performed.

In a case where the service ID of the print service 370 is included in the list of registered services acquired in step S909, this means that registration of an authenticator is previously performed. In other words, this means that the user has permitted the print service 370 to make a request for biometric authentication to the portable terminal 102. Therefore, in the present exemplary embodiment, the browser 300 skips displaying of a prompt screen compliant with WebBluetooth API (or WebUSB API) for inquiring of the user whether to permit a web application serving as the print service 370 to access the portable terminal 102. Thus, without a prompt screen (permission prompt) being displayed, the browser 300 permits access to the portable terminal 102. Accordingly, without a temporary user of, for example, an MFP which is located at a public place being asked to perform permission via the prompt screen on the MFP, biometric authentication processing is performed by the portable terminal 102. This not only improves convenience for users but also prevents permission information (a combination of identification information about a web application and identification information about the portable terminal 102) including identification information about the portable terminal 102 from being left on an MFP 101 which is located at a public place.

On the other hand, if, in step S1201, it is determined that the service ID of the print service 370 is not included in the list of registered services (NO in step S1201), the script execution unit 302 advances the processing to step S1202.

In step S1202, the display unit 301 of the browser 300 displays an authentication method selection screen (not illustrated). The authentication method selection screen displayed in step S1202 is a screen obtained by omitting the button 1003 from the authentication method selection screen 1000 described with reference to FIG. 10A, and is thus a screen for prompting the user to perform inputting to use the print service 370 without using the portable terminal 102. Displaying the authentication method selection screen in step S1202 enables performing printing using another authentication method (i.e., an authentication method different from biometric authentication using the portable terminal 102).

Next, in step S1203, the display unit 301 of the browser 300 determines which button is the button selected by the user. If it is determined that the button 1004 has been pressed ("CANCEL" in step S1203), the display unit 301 ends the processing in the present flowchart, and also ends the sequence of print processing illustrated in FIG. 9.

Moreover, if it is determined that the button 1001 has been pressed ("INPUT RESERVATION CODE" in step S1203), the display unit 301 advances the processing to step S1204.

In step S1204, the MFP 101 performs print processing with reservation code, then ends the processing in the present flowchart, and also ends the sequence of print processing illustrated in FIG. 9.

In the print processing with reservation code, as mentioned above, the MFP 101 transmits, to the print system 103, an acquisition request for print data in which a reservation code input by the user is included. Then, the print system 103 transmits, as a response to the MFP 101, print data which matches the reservation code based on the print data management table (Table 3). The MFP 101 performs print processing of the received print data.

Moreover, if it is determined that the button 1002 has been pressed ("PASSWORD AUTHENTICATION" in step S1203), the display unit 301 advances the processing to step S1205.

In step S1205, the MFP 101 performs print processing with legacy authentication, then ends the processing in the present flowchart, and also ends the sequence of print processing illustrated in FIG. 9.

As mentioned above, in the print processing with legacy authentication, a legacy authentication similar to that described in steps S602 to S604 illustrated in FIG. 6 is performed. If the legacy authentication is successful, the MFP 101 is able to acquire, from the print system 103, a list of pieces of print data corresponding to the user ID of the authenticated user, which have been managed in the print data management table (Table 3).

Subsequent description refers back to that of FIG. 9.

Furthermore, in the sequence diagram of FIG. 9, a case where it is determined that the service is a registered service is described.

Next, in step S911, the script execution unit 302 of the browser 300 analyzes JavaScript and invokes the Bluetooth control unit 304. Then, the Bluetooth control unit 304 transmits a connection start request to the portable terminal 102. For example, the Bluetooth control unit 304 invokes "connect" of the WebBluetooth API.

Upon receiving the connection start request transmitted in step S911, then in step S912, the portable terminal 102 transmits a connection result as a response to the MFP 101. When this connection is completed, an operation on the portable terminal 102 becomes possible based on JavaScript provided by the print service 370 of the print system 103, so that subsequent processing for biometric authentication is performed.

Upon receiving a response about the connection result, the browser 300 of the MFP 101 advances the processing to step S913. In step S913, the script execution unit 302, which executes JavaScript provided by the print service 370, invokes the biometric authentication control unit 303. The biometric authentication control unit 303 transmits an authentication request together with authentication request data 1110 illustrated in FIG. 11B to the authenticator 350 of the portable terminal 102 via the Bluetooth control unit 304. Here, the authentication request data 1110 is described with reference to FIG. 11B.

Figure 11B:
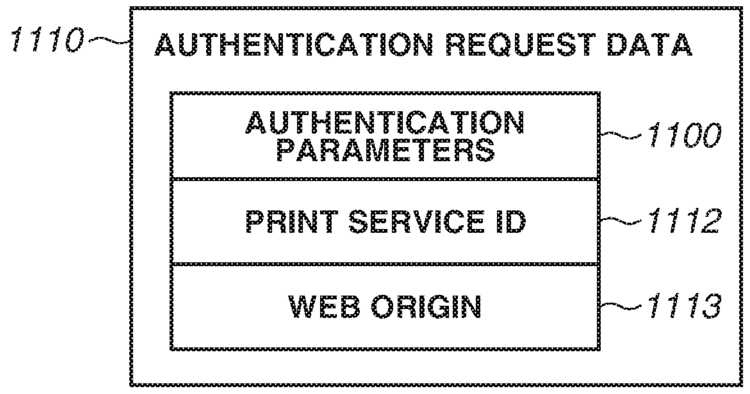

FIG. 11B is a diagram illustrating an example of the authentication request data 1110.

As illustrated in FIG. 11B, the authentication request data 1110 includes authentication parameters 1100 generated by the print service 370, a print service ID 1112, and a web origin 1113. The web origin 1113 is the origin of the print service 370. The print service ID 1112 stores information about a top-level domain and a second-level domain of the print service 370. For example, in a case where the URL of the print service 370 is "https://www.pull-print.com", the print service ID 1112 becomes "pull-print.com".

Figure 12B:
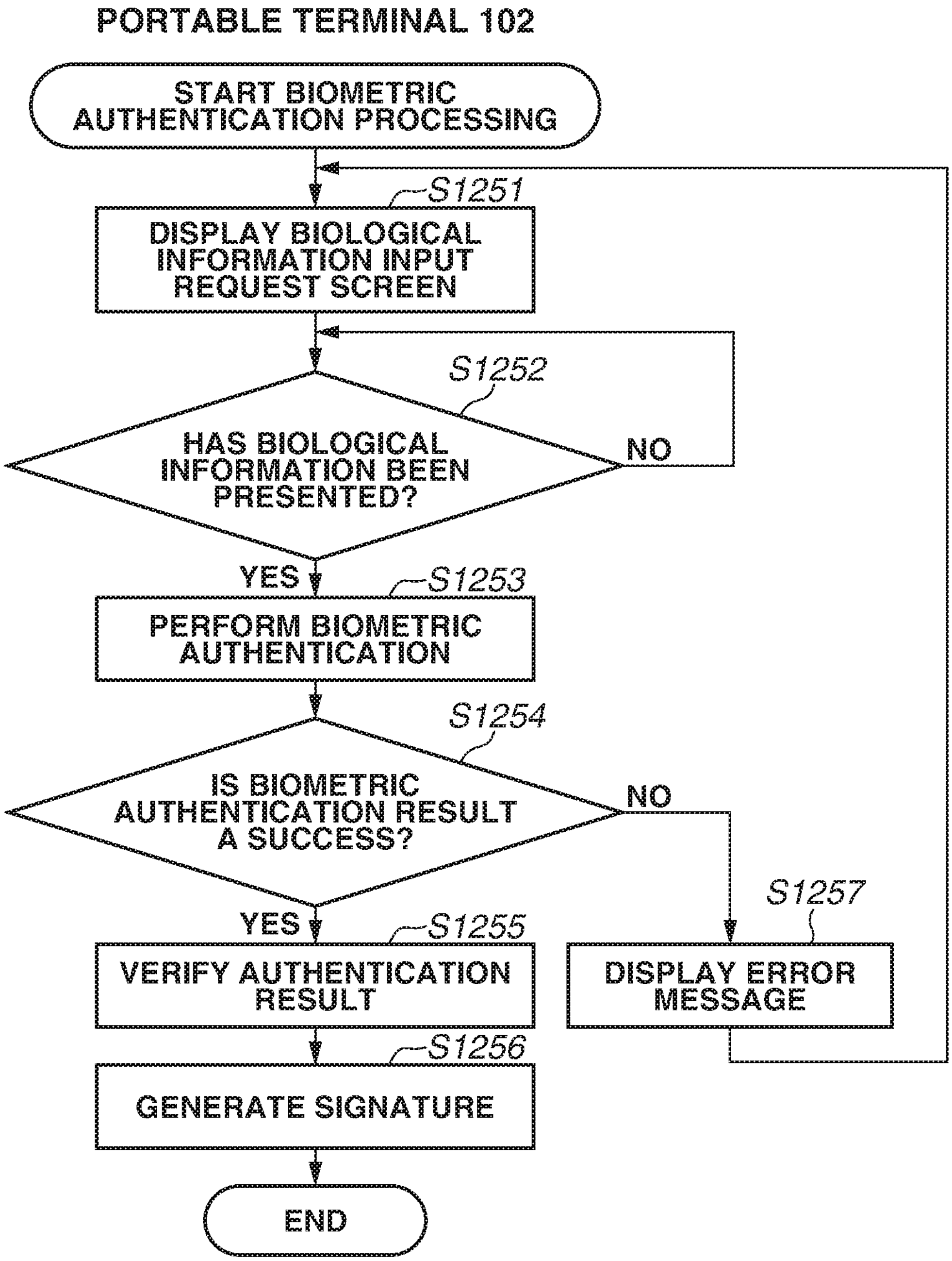

In step S914, the authenticator 350 of the portable terminal 102 performs biometric authentication processing (FIG. 12B). Here, the biometric authentication processing is described with reference to FIG. 12B.

FIG. 12B is a flowchart illustrating biometric authentication processing which is performed in the portable terminal 102. Processing in the flowchart of FIG. 12B is implemented by the CPU 242 of the portable terminal 102 reading out a program stored in, for example, the ROM 244 onto the RAM 243 and executing the read-out program.

Figure 13:
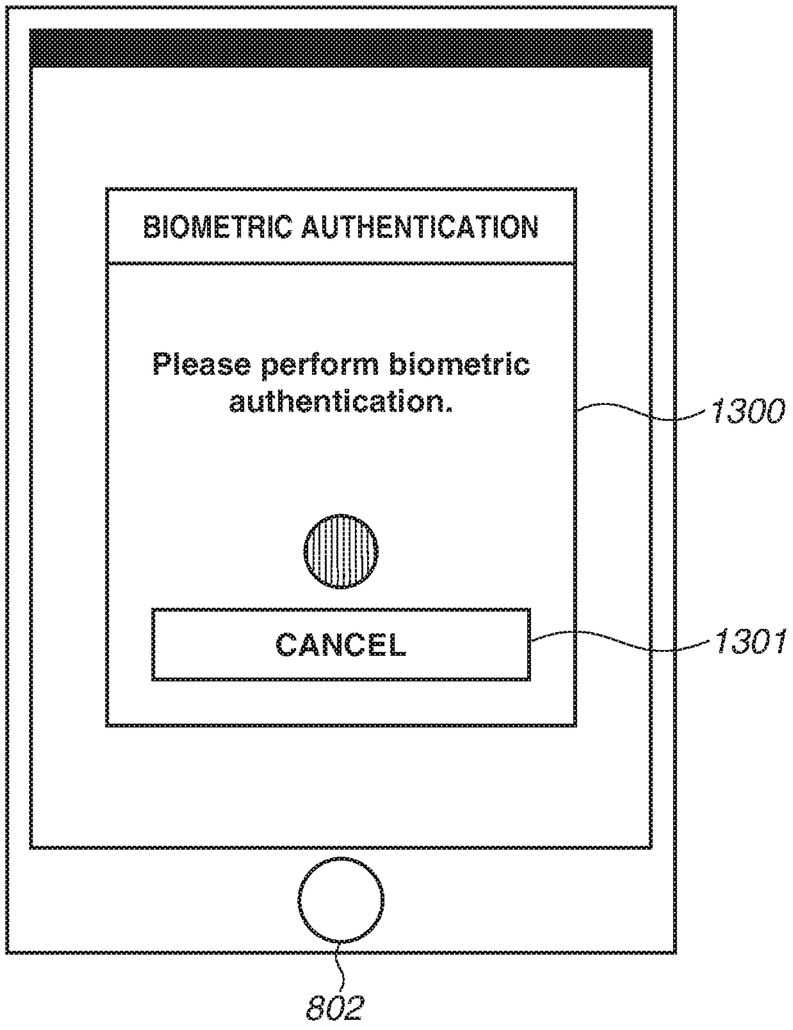
FIG. 13 is a diagram illustrating an example of a UI of a portable terminal at the time of biometric authentication.

In step S1251, the biological information request unit 354 of the authenticator 350 displays an input request screen 1300 for biological information such as that illustrated in FIG. 13. Here, the input request screen 1300 for biological information is described with reference to FIG. 13.

FIG. 13 is a diagram illustrating an example of the input request screen 1300 for biological information.

As illustrated in FIG. 13, the input request screen 1300 is a screen which prompts the user of the portable terminal 102 communicating with the MFP 101 via Bluetooth as mentioned above to input biological information. A button 1301 is used to cancel inputting of biological information, and, in a case where the button 1301 has been pressed, the portable terminal 102 ends the processing in the flowchart of FIG. 12B and also ends the processing of sequence illustrated in FIG. 9.

A button 802 is provided with the biological information sensor 248. Which performs reading of biological information.

Subsequent description refers back to that of FIG. 12B.

Next, in step S1252, the biological information request unit 354 of the authenticator 350 monitors whether biological information has been input by the user. During a period in which biological information is not yet input, the biological information request unit 354 continues such monitoring. Then, if biological information has been input, the biological information request unit 354 advances the processing to step S1253.

In step S1253, the biometric authentication processing unit 352 of the authenticator 350 acquires the feature amount of the input biological information about the user, and then performs matching between the acquired feature amount and information stored in the TPM 246 by the authentication information storage unit 353, thus performing biometric authentication. This feature amount is an amount obtained by converting an amount unique to an individual, such as the pattern of a Fingerprint, the pattern of an iris, or the shape of a vein, into such a value as not to impair a unique property. Identifying an individual using such a feature amount unique to an individual is biometric authentication.

Next, in step S1254, the biometric authentication processing unit 352 of the authenticator 350 determines whether the result of biometric authentication is a success. If it is determined that the result of biometric authentication is nota success (is a failure) (NO in step S1254), the biometric authentication processing unit 352 advances the processing to step S1257.

In step S1257, the biological information request unit 354 of the authenticator 350 displays a message indicating that the biometric authentication has resulted in an error, and then returns the processing to step S1251, thus performing control to prompt the user to re-perform biometric authentication. Furthermore, although not illustrated in FIG. 12B, a configuration in which, when a failure has occurred a plurality of times, the biometric authentication processing in step S914 is regarded as an error and the processing of sequence illustrated in FIG. 9 is ended can be employed.

On the other hand, if, in step S1254, it is determined that the result of biometric authentication is a success (YES in step S1254), the biometric authentication processing unit 352 advances the processing to step S1255.

In step S1255, the biometric authentication processing unit 352 of the authenticator 350 specifies a corresponding private key from the authentication information management table (Table 1) based on the print service ID 1112 and a biological information ID of the biological information with which authentication is successful in step S1253. In step S1256, the biometric authentication processing unit 352 of the authenticator 350 generates a signature 1122 from the assertion challenge 1101 with use of the specified private key, and then advances the processing to step S915 illustrated in FIG. 9. Then, the biometric authentication processing unit 352 proceeds with the sequence of print processing illustrated in FIG. 9. In the processing illustrated in FIG. 9, an example of the case where, in the biometric authentication processing, biometric authentication of the user of the portable terminal 102 is successful is described. Subsequent description refers back to that of FIG. 9.

Figure 11C:
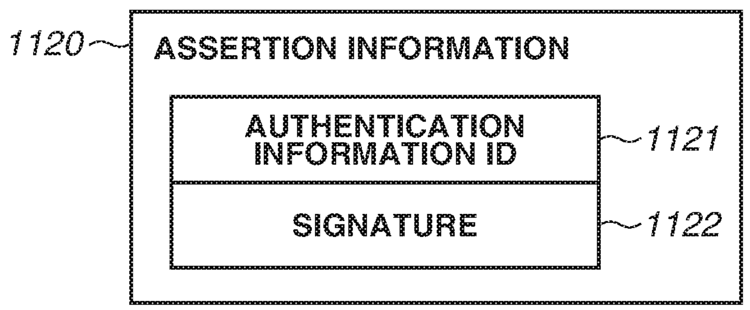

Next, in step S915, the biometric authentication processing unit 352 of the authenticator 350 returns assertion information 1120 including the signature 1122 illustrated in FIG. 11C to the browser 300 of the MFP 101. The assertion information 1120 is configured with an authentication information ID 1121 and the signature 1122, which is obtained by encrypting the assertion challenge 1101 with a private key corresponding to biometric authentication information about the user.

Next, in step S916, the communication unit 306 of the browser 300 transmits the assertion information 1120 received in step S915 to the print service 370 of the print system 103. Upon receiving the assertion information 1120, the print service 370 of the print system 103 advances the processing to step S917.

In step S917, the authenticator information processing unit 372 of the print service 370 verifies the assertion information 1120. More specifically, the authenticator information processing unit 372 compares data obtained by decrypting the signature 1122 included in the assertion information 1120 with a public key specified by the authentication information ID 1121 with the assertion challenge 1101 included in the authentication parameters 1100 generated in step S902. Then, in response to the data obtained by decryption coinciding with the assertion challenge 1101 included in the authentication parameters 1100, the authenticator information processing unit 372 verities the validity of the assertion information. Specifying a public key is performed using the authenticator information management table (Table 5).

Next, in step S918, the token management unit 379 of the print service 370 issues a token for the user corresponding to the assertion information 1120 verified in step S917. Next, in step S919, the communication unit 374 of the print service 370 returns the token issued in step S918 to the browser 300 of the MFP 101. Upon receiving the token, the browser 300 of the MFP 101 advances the processing to step S920.

In step S920, the communication unit 306 of the browser 300 transmits a request for a list of pieces of print data together with the token received in step S919 to the print service 370 of the print system 103. Upon receiving the request for a list of pieces of print data, the print service 370 advances the processing to step S921.

In step S921, the communication unit 374 of the print service 370 transmits, to the browser 300 of the MFP 101, a list of pieces of print data of the user associated with the token received in step S920. In consideration of a communication volume, the list of pieces of print data includes values of a data name column and a reservation code column of the print data management table (Table 3) but does not include values of a print data column thereof, which is binary data. Upon receiving the list of pieces of print data, the browser 300 advances the processing to step S922.

In step S922, the display unit 301 of the browser 300 displays the list of pieces of print data received in step S921. Here, a print data list screen is described with reference to FIG. 10B, FIG. 10B is a diagram illustrating an example of the print data list screen.

Figure 10B:
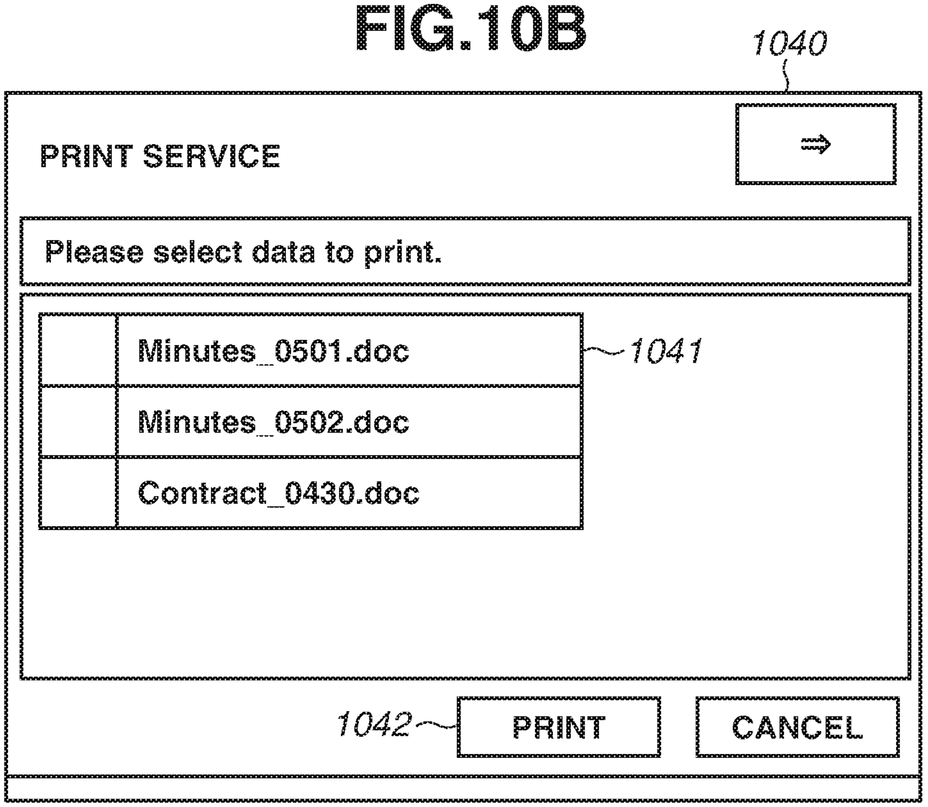

As illustrated in FIG. 10B, the print data list screen 1040 includes a list 1041 and a button 1042.

The list 1041 indicates information about pieces of print data, each of which is selectable. The selected print data becomes a target for printing.

The button 1042 is a button used to issue an instruction to perform printing. When print data is selected in the list 1041, upon receiving pressing of the button 1042, the display unit 301 of the browser 300 advances the processing to step S923.

Subsequent description refers back to that of FIG. 9.

In step S923, the communication unit 306 of the browser 300 transmits an acquisition request for print data selected in the print data list screen 1040 to the print service 370 of the print system 103. Upon receiving the acquisition request for print data, the print service 370 advances the processing to step S924.

In step S924, the communication unit 374 of the print service 370 transmits print data designated in step S923 to the browser 300 of the MFP 101. The print data to be transmitted in step S924 includes a print data column, which is binary data. Upon receiving the print data, the browser 300 advances the processing to step S925.

In step S925, the script execution unit 302 of the browser 300 invokes the print control unit 305, thus performing print processing using the received print data, so that the processing represented by the present sequence is completed.

As described above, the present exemplary embodiment enables specifying a web application trusted by the user without relying on a permission prompt. As a result, it is possible to prevent information about the permitted web application and the portable terminal from being stored in the web browser of a device such as an image processing apparatus. As a result, permission information, i.e., information about a Bluetooth or USB device owned by an individual, can be prevented from being left on the web browser of, for example, a multifunction peripheral located at a public place such as a convenience store, so that security can be improved. Moreover, in the present exemplary embodiment, the web browser of, for example, a multifunction peripheral acquires information about a registered service from a portable terminal and determines whether a service providing system is permitted to access the portable terminal. With this, in a case where information corresponding to the web application is previously registered with the portable terminal, access from the web application to the portable terminal is permitted without displaying of a permission prompt. Therefore, an authentication request is smoothly performed from the portable terminal to the user, so that user convenience is also improved. Accordingly, in a system using a device which can be located at a public place, a secure authentication environment improved in convenience for users can be built up.

Next, a second exemplary embodiment is described with reference to FIG. 14 and FIG. 15.

In the above-described first exemplary embodiment, the MFP 101 is located at a public place, and the browser 300 of the MFP 101 is configured not to leave permission information and not to display a screen for asking permission. In the second exemplary embodiment, supposing that the MFP 101 is located at a non-public place, such as in a company or at an individually owned place, an example in which a permission screen is displayed is described. In the following description, only differences from the first exemplary embodiment are described.

Figure 14:
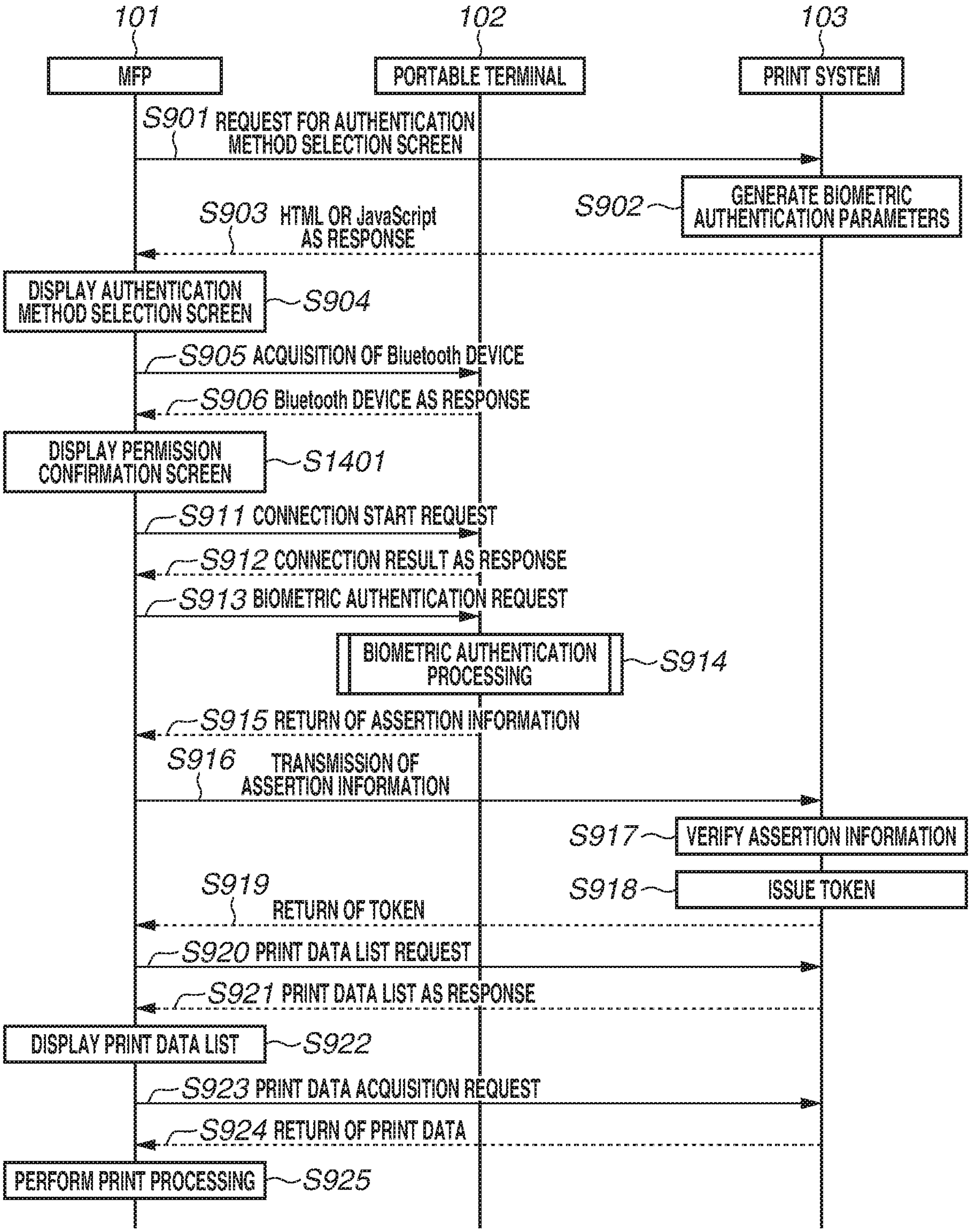
FIG. 14 is a sequence diagram illustrating an example of print processing for print data in a second exemplary embodiment.

FIG. 14 is a sequence diagram illustrating an example of print processing of print data in the second exemplary embodiment. Furthermore, in FIG. 14, processing which is performed by the MFP 101 is implemented by the CPU 221 of the MFP 101 reading out a program stored in, for example, the ROM 223 onto the RAM 222 and executing the read-out program. Moreover, processing which is performed by the portable terminal 102 is implemented by the CPU 242 of the portable terminal 102 reading out a program stored in, for example, the ROM 244 onto the RAM 243 and executing the read-out program. Moreover, processing which is performed by the print system 103 is implemented by the CPU 201 of a server PC which provides the print system 103 reading out a program stored in, for example, the external memory 210 onto the RANI 202 and executing the read-out program.

In the second exemplary embodiment, only differences from FIG. 9 described in the first exemplary embodiment are described. The differences from the first exemplary embodiment are that processing in step S1401 is performed without processing in steps S907 to S910 being performed. In step S1401, the display unit 301 of the browser 300 displays a permission confirmation screen 1500 such as that illustrated in FIG. 15. The permission confirmation screen 1500 is a screen used to ask the user to permit the print service 370 of the print system 103 to operate the portable terminal 102. Here, the permission confirmation screen 1500 is described with reference to FIG. 15.

Figure 15:
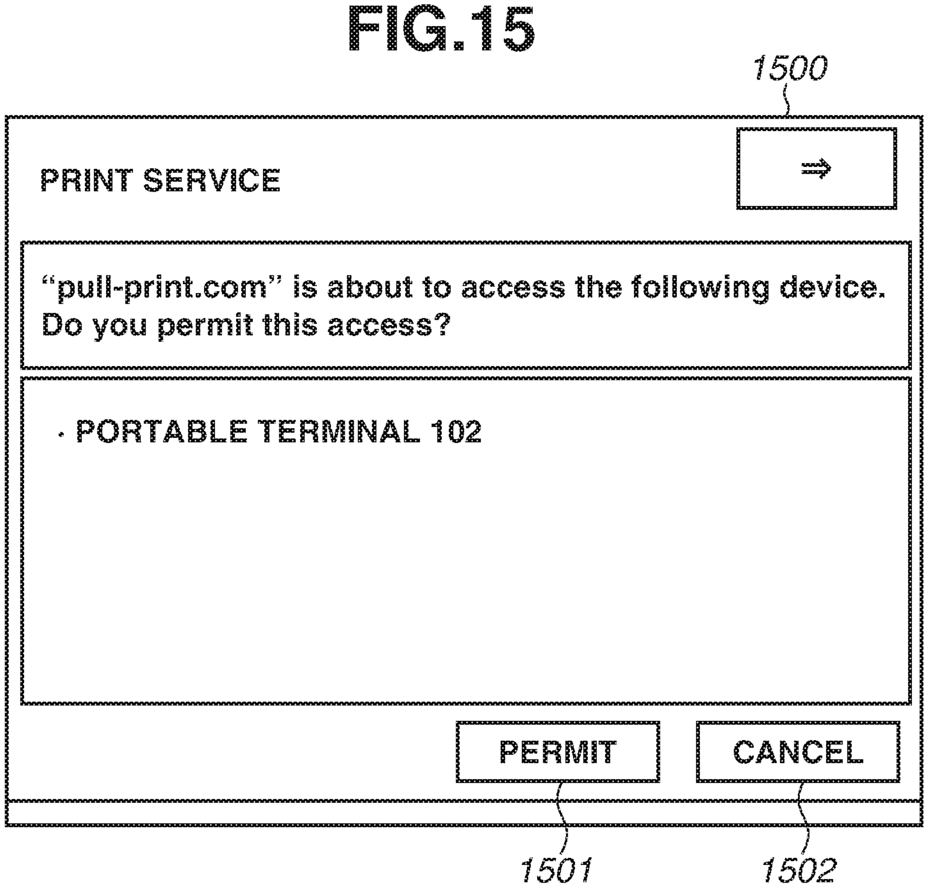
FIG. 15 is a diagram illustrating an example of a UI of an MFP in the second exemplary embodiment.

FIG. 15 is a diagram illustrating an example of the permission confirmation screen 1500.

As illustrated in FIG. 15, the permission confirmation screen 1500 includes a button 1501 and a button 1502. The button 1501 is a button used to permit the print service 370 of the print system 103 to operate the portable terminal 102. In a case where the button 1501 has been pressed, processing in step S911 and subsequent steps is continued, so that biometric authentication is performed. Since the MFP 101 is not located at a public place, a configuration in which, if a permission is issued once, then, the browser 300 retains information indicating the issuance of a permission and does not display a permission screen next time can be employed.

The button 1502 is a button used to perform cancellation without issuing a permission. In a case where the button 1502 has been pressed, processing in step S911 and subsequent steps illustrated in FIG. 14 is ended without being performed.

Furthermore, the above-described exemplary embodiments are not limited by the above-mentioned configurations and contents of various pieces of data, but can be configured with various configurations and contents of pieces of data according to use applications or purposes.

While exemplary embodiments have been described above, the present disclosure can be embodied as, for example, a system, an apparatus, a method, a program, or a storage medium. Specifically, the present disclosure can be applied to a system configured with a plurality of devices, or can be applied to an apparatus configured with a single device.

Moreover, all of the configurations obtained by combining the above-described exemplary embodiments are also included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-232344, filed Dec. 12, 2018, which is hereby incorporated by reference herein in its entirety.

What is claimed is:

1. An information processing apparatus comprising:

at least one memory storing instructions related to a web browser; and at least one processor executing the instructions causing the information processing apparatus to:

when a user uses a web application via the information processing apparatus and authentication processing is to be performed at an external terminal connected to the information processing apparatus, transmit a request for information about service to the external terminal;

when information about the web application is included in the information about service received from the external terminal responsive to the request, transmit an authentication request to the external terminal based on information required for authentication that is received from the web application; and transmit, to the web application, data about an authentication result received from the external terminal responsive to the authentication request, wherein, when information about the web application is included in the information about service received from the external terminal, processing for storing identification information about the external terminal in the information processing apparatus by the web browser is not performed.

2. The information processing apparatus according to claim 1, wherein, when information about the web application is included in the received information, the authentication request is transmitted to the external terminal without the web browser providing a screen that requests permission for the web application to access the external terminal.

3. The information processing apparatus according to claim 1, wherein the information about service received from the external terminal is information about a service for which a public key corresponding to a private key used for authentication processing at the external terminal has been registered.

4. The information processing apparatus according to claim 3, wherein the data about an authentication result includes a signature generated using the private key and a parameter received from the web application.

5. The information processing apparatus according to claim 1, wherein the instructions further cause the information processing apparatus to, when information about the web application is not included in the information about service received from the external terminal, display a screen used to prompt the user to request using the web application without using the external terminal.

6. The information processing apparatus according to claim 1, wherein the information processing apparatus is configured to be connected to the external terminal via Universal Serial Bus (USB) or Bluetooth.

7. The information processing apparatus according to claim 1, wherein the authentication is biometric authentication.

8. A method for an information processing apparatus, the method comprising:

before authentication processing to use a web application via the information processing apparatus by user is performed at an external terminal connected to the information processing apparatus, transmitting a request for information about service to the external terminal;

when information about the web application is included in the information about service received from the external terminal responsive to the request, transmitting an authentication request to the external terminal based on information required for authentication that is received from the web application; and transmitting, to the web application, data about an authentication result received from the external terminal responsive to the authentication request, wherein, when information about the web application is included in the information about service received from the external terminal, processing for storing identification information about the external terminal in the information processing apparatus is not performed.

* * * * *